(12) United States Patent
Kondo et al.

(10) Patent No.: US 8,072,492 B2
(45) Date of Patent: Dec. 6, 2011

(54) MOBILE TERMINAL DEVICE

(75) Inventors: Satoshi Kondo, Kyoto (JP); Hisao Sasai, Osaka (JP); Takahiro Nishi, Nara (JP); Tadamasa Toma, Osaka (JP); Toshiyasu Sugio, Osaka (JP); Yoshinori Matsui, Nara (JP)

(73) Assignee: Panasonic Corporation, Osaka (JP)

( * ) Notice: Subject to any disclaimer, the term of this patent is extended or adjusted under 35 U.S.C. 154(b) by 1453 days.

(21) Appl. No.: 10/594,147

(22) PCT Filed: May 17, 2005

(86) PCT No.: PCT/JP2005/008932
§ 371 (c)(1),
(2), (4) Date: Sep. 25, 2006

(87) PCT Pub. No.: WO2005/120051
PCT Pub. Date: Dec. 15, 2005

(65) Prior Publication Data
US 2007/0216760 A1    Sep. 20, 2007

(30) Foreign Application Priority Data

Jun. 2, 2004 (JP) .................. 2004-165029

(51) Int. Cl.
*H04N 7/18* (2006.01)
*H04M 1/00* (2006.01)
(52) U.S. Cl. .................. 348/152; 455/522.1
(58) Field of Classification Search .......... 348/152, 348/14.01, 14.02; 455/522.1, 412.1, 556.1; H04N 7/18; H04M 1/00
See application file for complete search history.

(56) References Cited

U.S. PATENT DOCUMENTS 5,999,689 A    12/1999    Iggulden
(Continued)

FOREIGN PATENT DOCUMENTS

EP    1 601 193    11/2005
(Continued)

OTHER PUBLICATIONS

An Office Action issued Feb. 1, 2008 for the corresponding Chines patent application No. 200580008234.X (and its English translation).

(Continued)

*Primary Examiner* — Gims Philippe
(74) *Attorney, Agent, or Firm* — Wenderoth, Lind & Ponack, L.L.P.

(57) ABSTRACT

To provide a mobile terminal device which can perform an operation reflecting the intention of a user when an event, such as the arrival of an incoming phone call or an email, occurs while a television broadcast is being displayed, and which can also improve the operability. A mobile terminal device is composed of: a TV reception unit which receives a television broadcast signal; an output control unit which controls outputs of video and audio of the television broadcast, auxiliary information of the television broadcast, the email, audio of the phone call, and video and audio of a video phone call, to a first display unit, a second display unit, and an audio reproduction unit; a recording control unit which records a television broadcast program onto a recording medium; a reproduction control unit which reproduces the television broadcast program recorded on the recording medium; a control unit which controls an operation performed when the email or the phone call is receives while the television broadcast is being displayed; and an unfold/fold detection unit which detects whether the mobile terminal device is folded or unfolded.

55 Claims, 12 Drawing Sheets

U.S. PATENT DOCUMENTS

| | | | |
|---|---|---|---|
| 7,139,014 B1 * | 11/2006 | Kim et al. | 348/14.01 |
| 7,251,476 B2 * | 7/2007 | Cortegiano | 455/412.1 |
| 7,254,415 B2 * | 8/2007 | Okamura | 455/556.1 |
| 7,495,686 B2 * | 2/2009 | Yunoki | 348/14.01 |
| 2001/0029196 A1 | 10/2001 | Wakamatsu | |
| 2004/0052504 A1 | 3/2004 | Yamada et al. | |
| 2004/0055011 A1 | 3/2004 | Bae et al. | |
| 2005/0044572 A1 | 2/2005 | Osumi | |
| 2005/0070327 A1 * | 3/2005 | Watanabe | 455/552.1 |
| 2005/0262542 A1 | 11/2005 | DeWeese et al. | |
| 2005/0278751 A1 | 12/2005 | Wada et al. | |
| 2006/0031886 A1 | 2/2006 | Bae et al. | |
| 2006/0037050 A1 | 2/2006 | Bae et al. | |
| 2006/0190966 A1 | 8/2006 | McKissick et al. | |
| 2007/0124795 A1 | 5/2007 | McKissick et al. | |
| 2007/0216760 A1 * | 9/2007 | Kondo et al. | 348/14.02 |
| 2011/0047487 A1 | 2/2011 | DeWeese et al. | |

FOREIGN PATENT DOCUMENTS

| | | |
|---|---|---|
| JP | 2001-094893 | 4/2001 |
| JP | 2002-524934 | 8/2002 |
| JP | 2003-051993 | 2/2003 |
| JP | 2003-109121 | 4/2003 |
| JP | 2003-110955 | 4/2003 |
| JP | 2003-111004 | 4/2003 |
| JP | 2003-329459 | 11/2003 |
| JP | 2004-112076 | 4/2004 |
| JP | 2004-112370 | 4/2004 |
| JP | 2004-112807 | 4/2004 |
| JP | 2004-274140 | 9/2004 |
| JP | 2005-065129 | 3/2005 |
| JP | 2005-130132 | 5/2005 |
| JP | 2005-151338 | 6/2005 |
| JP | 2005-223819 | 8/2005 |

OTHER PUBLICATIONS

English translation of Figs. 2 and 4 of JP 2003-329459 (which was submitted in an Information Disclosure Statement filed Sep. 25, 2006).

Supplementary European Search Report issued Mar. 4, 2009 in EP 05 74 1453, which is a foreign counterpart to the present application.

ARIB TR-B14: Dai 3 Pen Chijo Digital Television Housou Data Housou Unyou Kitei (Chapter 3: Digital Terestial Television Broadcasting Data Broadcasting Operation Reguation) (with translation).

Full English Language Machine Translation JP2003-329459 (which was submitted in the Information Disclosure Statement filed on Sep. 25, 2006).

* cited by examiner

FIG. 4
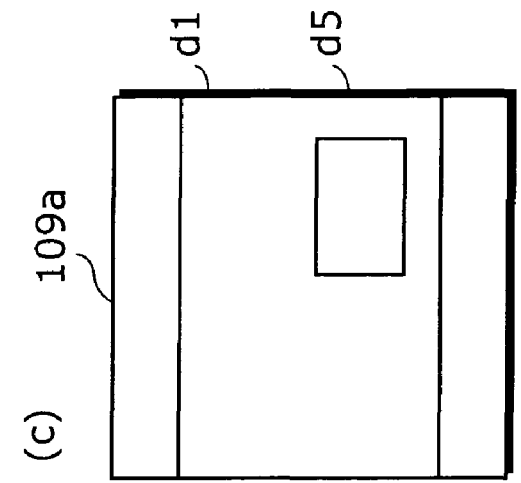
(c)
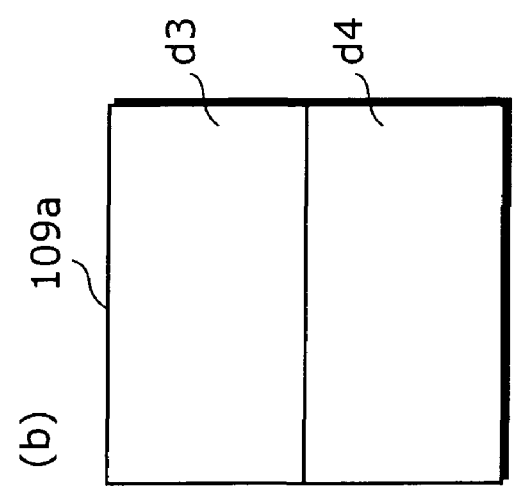
(b)
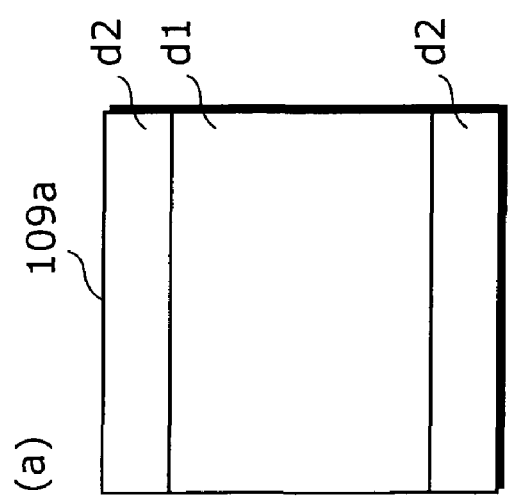
(a)

MOBILE TERMINAL DEVICE

TECHNICAL FIELD

The present invention relates to a mobile terminal device, such as a mobile phone or a personal digital assistant, and particularly to a mobile terminal device that receives and displays a television broadcast.

BACKGROUND ART

In regard to mobile terminal devices such as mobile phones and personal digital assistants, recent years have seen the developments in size reduction and multi-functionalization of the devices. Among such devices, there are models coming along that can receive and display a television broadcast. The developments in size reduction and multi-functionalization can also be seen in regard to viewing devices, and there are viewing devices coming along that allow viewing and recording of the television broadcast at the same time.

Among such viewing devices, there is a proposed mobile viewing device that simultaneously receives a terrestrial digital broadcast and records it into a memory card while a user is viewing the broadcast. In this state of things, when the user has to stop viewing due to something else to do, this proposed mobile viewing device records mark information, which indicates the position at which the user stopped viewing, into the memory card (see Patent Reference 1, for example). In the case of this mobile viewing device, when the program reproduction is resumed later from the memory card, the program is reproduced from start of the unviewed portion of the program, on the basis of the mark information.

Patent Reference 1: Japanese Application Publication No. 2003-101921.

SUMMARY OF THE INVENTION

Problems that Invention is to Solve

The mobile viewing device as described above, however, executes the recording all the while during the viewing, ending up recording an unnecessary part. This results in making waste. Also, in order to execute the recording all throughout, a high-capacity storage area is required. This may also cause a problem that only one memory card is not enough to execute the recording.

For the case where an email arrives while a television broadcast is being displayed, a mobile phone with a function of receiving a television broadcast is so constructed as to display a mark indicating the arrival of the email on a screen on which the television broadcast is being displayed. Thus, when wishing to confirm the contents of the email, the user has to first stop the displaying of the television broadcast and then switch to an email mode, which is a complicated operation. Moreover, when an incoming phone call arrives and is answered, the user cannot view the television broadcast.

An operation to be performed when the incoming phone call or an email arrives while the television broadcast is being displayed is predetermined and fixed, and the intention of the user cannot be reflected.

The present invention was conceived in view of the stated problems, and an object of the present invention is to provide a mobile terminal device which can perform an operation reflecting the intention of the user when an event, such as the arrival of an incoming phone call or an email, occurs while a television broadcast is being displayed, and which can also improve the operability.

Means to Solve the Problems

In order to achieve the above object, a mobile terminal device of the present invention is composed of: a broadcast reception unit operable to receive a television broadcast signal;

a display unit operable to display video; an audio reproduction unit operable to reproduce audio; and a control unit operable, when an event occurs while the received television broadcast is being outputted by the display unit and the audio reproduction unit, to control at least one of a displaying of video of the television broadcast by the display unit, a reproduction of audio of the television broadcast by the audio reproduction unit, and the event.

With this, the device can perform the operation reflecting the intention of the user when an event, such as the arrival of an incoming phone call or an email, occurs while the television broadcast is being displayed.

Moreover, the mobile terminal device may be further composed of a transmission/reception unit operable to transmit and receive an email, wherein the event is a reception of the email, and the control unit is operable, when the email is received, to control the displaying of the video, the reproduction of the audio, and a processing of the email.

Here, the mobile terminal device is preferably further composed of: a storage unit operable to record the received television broadcast; and a recording control unit operable to control the recording of the television broadcast into the storage unit, wherein when the email is received, the control unit is operable to instruct the recording control unit to record the television broadcast and to have the display unit display the email.

With this, in the case where an email arrives and is to be displayed while the television broadcast is being displayed, the email can be confirmed immediately. In addition, the television broadcast program aired during the displaying of the email or the creation of a reply email can be viewed after the end of the displaying of the email.

Moreover, the mobile terminal device may be further composed of an output control unit operable to split a screen area of the display unit and to display the television broadcast and the email respectively on split areas, wherein when the email is received, the control unit is operable to instruct the output control unit to display the television broadcast and the email respectively on the split areas.

Furthermore, the mobile terminal device may be further composed of: a second display unit operable to display; and an output control unit operable to have the television broadcast and the email displayed respectively on the display unit and the second display unit, wherein when the email is received, the control unit is operable to instruct the output control unit to display the television broadcast and the email.

With this, in the case where an email arrives and is to be displayed while the television broadcast is being displayed, the user can confirm the email immediately and view the television broadcast at the same time. In addition, even while creating a reply email, the user can view the television broadcast.

Also, the mobile terminal device may be further composed of a transmission/reception unit operable to transmit and receive a phone call, wherein the event is a reception of the phone call, and the control unit is operable, when the phone call is received, to control the displaying of the video, the reproduction of the audio, and a processing of the phone call.

Here, the mobile terminal device is preferably further composed of: a storage unit operable to record the received television broadcast; and a recording control unit operable to control the recording of the television broadcast into the storage unit, wherein when the answer is to pick up the phone call, the control unit is operable to instruct the recording control unit to record the television broadcast and operable to perform a phone conversation processing.

With this, when an incoming phone call arrives and is answered while the television broadcast is being displayed, the user will be able to view the television broadcast aired during the phone call, after finishing the call.

Moreover, the mobile terminal device, having a first main body unit and a second main body unit which are connected via a connection unit to be able to overlap each other, may be further composed of: a storage unit operable to record the received television broadcast; a recording control unit operable to control the recording of the television broadcast into the storage unit; and an open/close detection unit operable to detect whether the first main body unit and the second main body unit overlap each other or are opened, wherein the event is the overlapping of the first main body unit and the second main body unit, and the control unit is operable, when the open/close detection unit detects the overlapping of the first main body unit and the second main body unit, to instruct the recording control unit to record the television broadcast. It should be noted here that when the first main body unit and the second unit are so connected via the connection unit as to be able to overlap each other, this means that the first main body unit and the second main body unit can be folded together via the connection unit or that the first main body unit and the second main body unit are slidable relative to each other via the connection unit.

Furthermore, the mobile terminal device may be further composed of a reproduction control unit operable to reproduce the recorded television broadcast, wherein when the open/close detection unit detects that the first main body unit and the second main body unit are opened from a state of the overlapping, the control unit is operable to instruct the recording control unit to record the television broadcast.

With this, the television broadcast program can be easily recorded only by folding the mobile terminal device. When the mobile terminal device is opened, the television broadcast program aired while the device was being folded can be viewed.

Also, the mobile terminal device may be further composed of an operation reception unit operable to receive an operation from the user, wherein the event is a reception of a predetermined operation by the operation reception unit, and the control unit is operable, when the operation reception unit receives the predetermined operation, to stop the displaying of the video, the reproduction of the audio, or the reception of the television broadcast.

With this, there is no power consumption of the display unit that consumes a lot of power. This allows power consumption to be accordingly reduced.

Moreover, the mobile terminal device may be further composed of a commercial detection unit operable to detect a commercial, wherein the event is a detection of the commercial by the commercial detection unit, and the control unit is operable, when the commercial detection unit detects the commercial, to stop the displaying of the video or the reproduction of the audio.

With this, during television commercials, there is no power consumption of the display unit that consumes a lot of power. Accordingly, power consumption can be reduced.

It should be noted here that the present invention may be realized not only as such a mobile terminal device, but also as: a method that has steps corresponding to the characteristic units provided in such a mobile terminal device; and a program that causes a computer to execute these steps. Also, it should be understood that such a program can be distributed via a recording medium such as a CD-ROM, or via a transmission medium such as the Internet.

Effects of the Invention

As is clear from the above explanation, the mobile terminal device of the present invention can perform an operation reflecting the intention of the user when an event, such as the arrival of an incoming phone call or an email, occurs while a television broadcast is being displayed. Accordingly, its practical value is extremely high today when mobile terminal devices that display a television broadcast are becoming widespread.

BRIEF DESCRIPTION OF DRAWINGS

FIG. 4 is a diagram showing a display area of a first display unit: (a) shows a case where only the television broadcast is displayed; (b) shows a case where the display area is split into two; and (c) shows a case where a sub-screen area is split off from the display area.

NUMERICAL REFERENCES

| 100 | mobile terminal device |
| 101 | TV reception unit |
| 102 | TV processing unit |
| 103 | auxiliary information processing unit |
| 104 | radio unit |
| 105 | transmission/reception unit |
| 106 | email processing unit |
| 107 | email saving unit |
| 108 | output control unit |
| 109a | first display unit |
| 109b | second display unit |
| 110 | audio reproduction unit |
| 111 | commercial detection unit |
| 112 | timer unit |
| 113 | call-answering processing unit |
| 114 | operation unit |
| 115 | recording medium |
| 116 | recording control unit |
| 117 | reproduction control unit |
| 118 | initialization unit |
| 119 | control unit |
| 120 | unfold/fold detection unit |
| 121 | notification unit |
| 122 | call processing unit |
| 123 | video/audio input unit |

DETAILED DESCRIPTION OF THE INVENTION

The following is a description of the embodiment of the present invention, with reference to the drawings.

Figure 1:
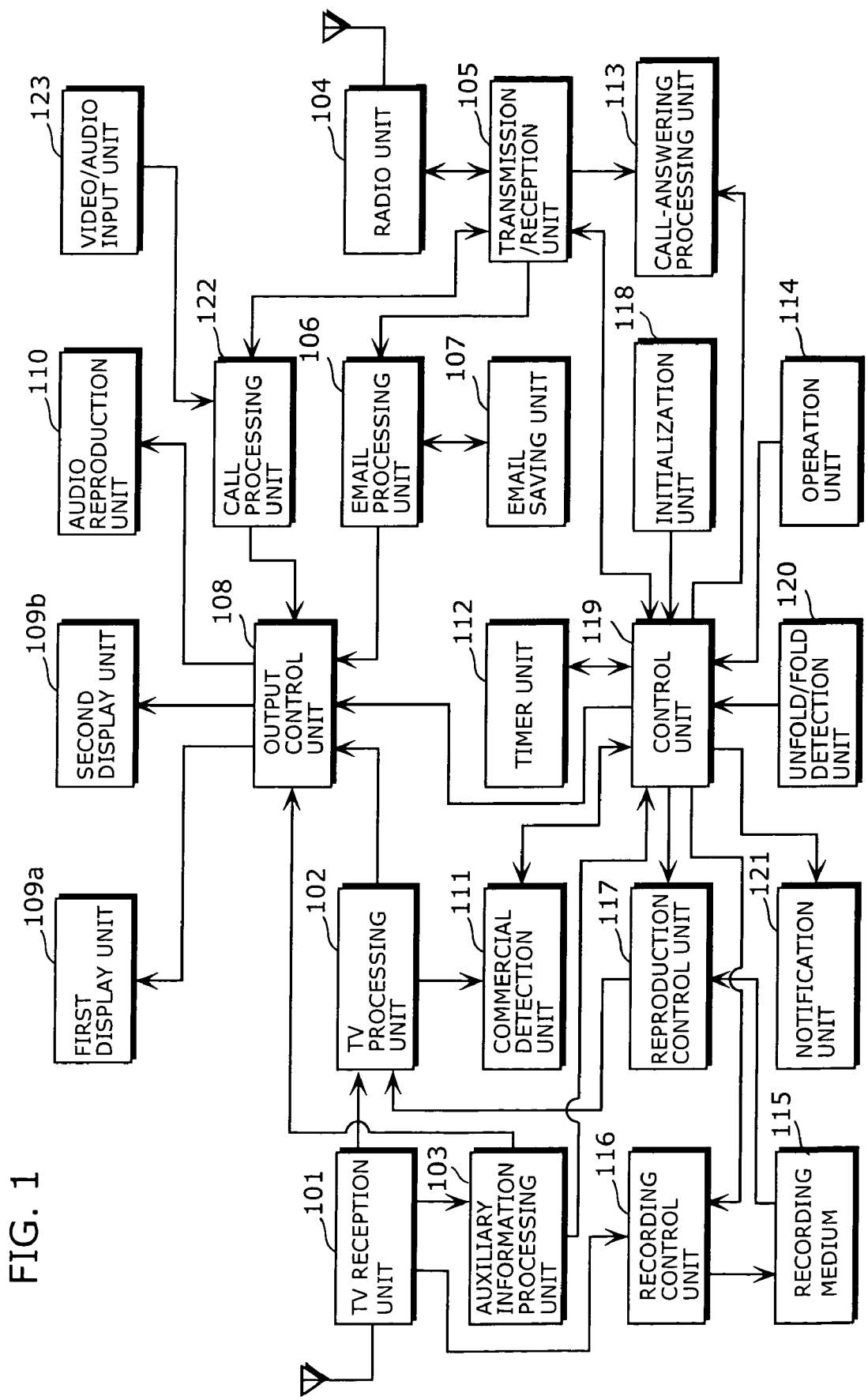
FIG. 1 is a block diagram showing a structure of a mobile terminal device according to an embodiment of the present invention.

FIG. 1 is a block diagram showing a structure of a mobile terminal device according to the embodiment of the present invention.

A mobile terminal device 100 is a device, such as a mobile phone, that is used for receiving a television broadcast, outputting the received television broadcast, making a phone call, and transmitting/receiving an email. As shown in FIG. 1, the mobile terminal device 100 is composed of a TV reception unit 101, a TV processing unit 102, an auxiliary information processing unit 103, a radio unit 104, a transmission/reception processing unit 105, an email processing unit 106, an email saving unit 107, an output control unit 108, a first display unit 109a, a second display unit 109b, an audio reproduction unit 110, a commercial detection unit 111, a timer unit 112, a call-answering processing unit 113, an operation unit 114, a recording medium 115, a recording control unit 116, a reproduction control unit 117, an initialization unit 118, a control unit 119, an unfold/fold detection unit 120, a notification unit 121, a call processing unit 122, and a video/audio input unit 123.

Figure 2:
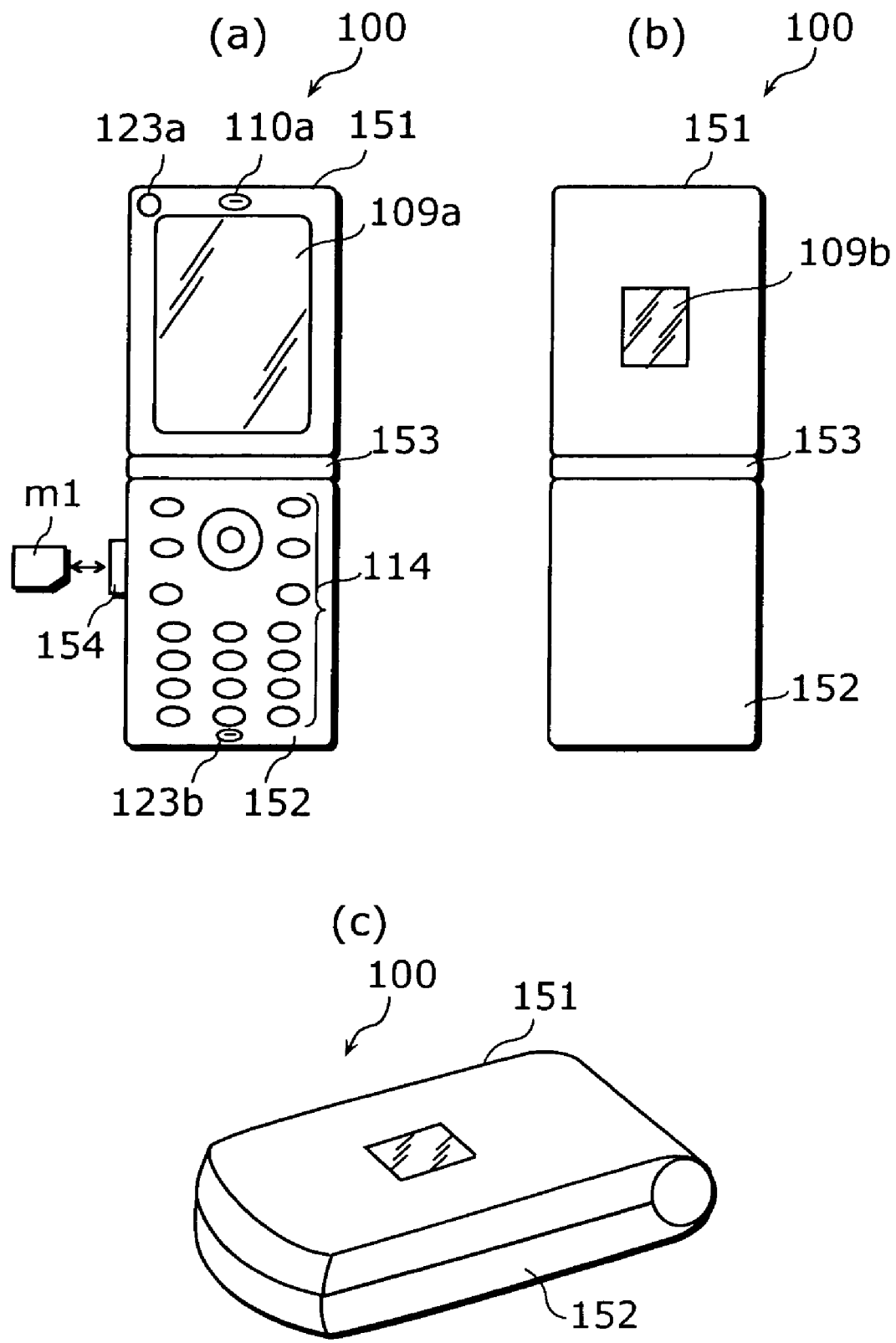
FIG. 2 is a diagram showing an external view of the mobile terminal device according to the embodiment of the present invention: (a) shows a front view of the mobile terminal device in an unfolded state; (b) shows a back view of the mobile terminal device in the unfolded state; and (c) shows a perspective view of the mobile terminal device in a folded state.

FIG. 2 is a diagram showing an external view of the mobile terminal device according to the embodiment of the present invention: (a) shows a front view of the mobile terminal device in an unfolded state; (b) shows a back view of the mobile terminal device in the unfolded state; and (c) shows a perspective view of the mobile terminal device in a folded state.

The mobile terminal device 100 has the first main body unit 151 and the second main body unit 152 which are connected via the connection unit 153 as shown in FIGS. 2(a) and (b), and is so structured as to be foldable as shown in FIG. 2(c). The first main body unit 151 has the first display unit 109a, a speaker 110a of the audio reproduction unit 110, and a camera 123a of the video/audio input unit 123 on the front, and the second display unit 109b on the back. The second main body unit 152 has the operation unit 114 including operation keys, such as numeric keys and arrow keys, and a microphone 123b of the video/audio input unit 123 on the front, and an interface 154 on the side, into which a memory card m1 which is the recording medium 115 is to be placed.

The TV reception unit 101 receives a television broadcast signal of a stream, such as an MPEG (Moving Picture Experts Group) 2 transport stream, that is broadcasted from a broadcast station. The TV processing unit 102 decodes the stream received by the TV reception unit 101 and then outputs video and audio of the television broadcast to the output control unit 108. The auxiliary information processing unit 103 extracts auxiliary information such as an electronic program guide (EPG) from the received stream and then outputs it to the output control unit 108.

The radio unit 104 conducts radio communications with a base station. The transmission/reception unit 105 performs a packet process on the received data or data to be transmitted. The email processing unit 106 generates and displays an email. The email saving unit 107 saves the emails which have been transmitted/received and an email in progress of creation. The call processing unit 122 performs a digitalization process on a voice-only phone call and a video phone call which is accompanied by video. The video/audio input unit 123 includes the camera 123a and the microphone 123b, and inputs the audio and the video.

The output control unit 108 controls outputs of: the video and audio of the inputted television broadcast; the auxiliary information of the television broadcast; the email; the audio of the voice phone call; and the video and audio of the video phone call, to the first display unit 109a, the second display unit 109b, and the audio reproduction unit 110. The first display unit 109a and the second display unit 109b display the video of the television broadcast, the auxiliary information of the television broadcast, the email, the video of the video phone call, etc. For example, the first display unit 109a displays the video of the television broadcast whereas the second display unit 109b displays the electronic program guide (EPG) extracted by the auxiliary information processing unit 103. In this way, they are capable of various kinds of displaying. The audio reproduction unit 110 reproduces the audio of the television broadcast, the audio of the voice phone call, the audio of the video phone call, etc.

The commercial detection unit 111 detects a commercial being aired on television by, for example, judging that a part in a monaural broadcast is a television program and that a part in a stereo broadcast is a commercial. The timer unit 112 measures a predetermined period of time. The call-answering processing unit 113 answers the received call with a predetermined message and then records a message from a caller. The operation unit 114 is provided with the operations key, such as the numeric keys and the arrow keys, which are used by the user to operate. The recording medium 115 is a storage unit, such as a memory card, a hard disc, or a built-in memory, that stores a television broadcast program. The recording control unit 116 records the received television broadcast program onto the recording medium 115. The reproduction control unit 117 reproduces the television broadcast program recorded on the recording medium 115.

The control unit 119 controls an operation performed when an email, a voice phone call, or a video phone call is received while a television broadcast is being displayed. The initialization unit 118 holds initial settings previously set by the user. The unfold/fold detection unit 120 detects whether the first main body unit 151 and the second main body unit 152 are folded or unfolded. The notification unit 121 notifies the user of the reception of a phone call, an email, etc. by a vibration, a sound, a light emission, a displayed indication, or the like.

Next, an explanation is given about an operation performed when the mobile terminal device 100 that is structured as described above displays a television broadcast.

First, the stream received by the TV reception unit 101 is inputted into the TV processing unit 102. The TV processing unit 102 decodes the inputted stream and then outputs the video and audio of the television broadcast to the output control unit 108. The output control unit 108 outputs the inputted video of the television broadcast to the first display unit 109*a*, and outputs the inputted audio of the television broadcast to the audio reproduction unit 110. In this way, the mobile terminal device 100 displays the television broadcast.

Next, explanations are given about respective operations to be performed in the cases where while the mobile terminal device 100 is displaying a television broadcast; an email, a voice phone call, or a video phone call is received; the mobile terminal device 100 is folded; an output stop key is pressed; and a commercial is detected.

(Receive an Email while a Television Broadcast is being Displayed)

Figure 3:
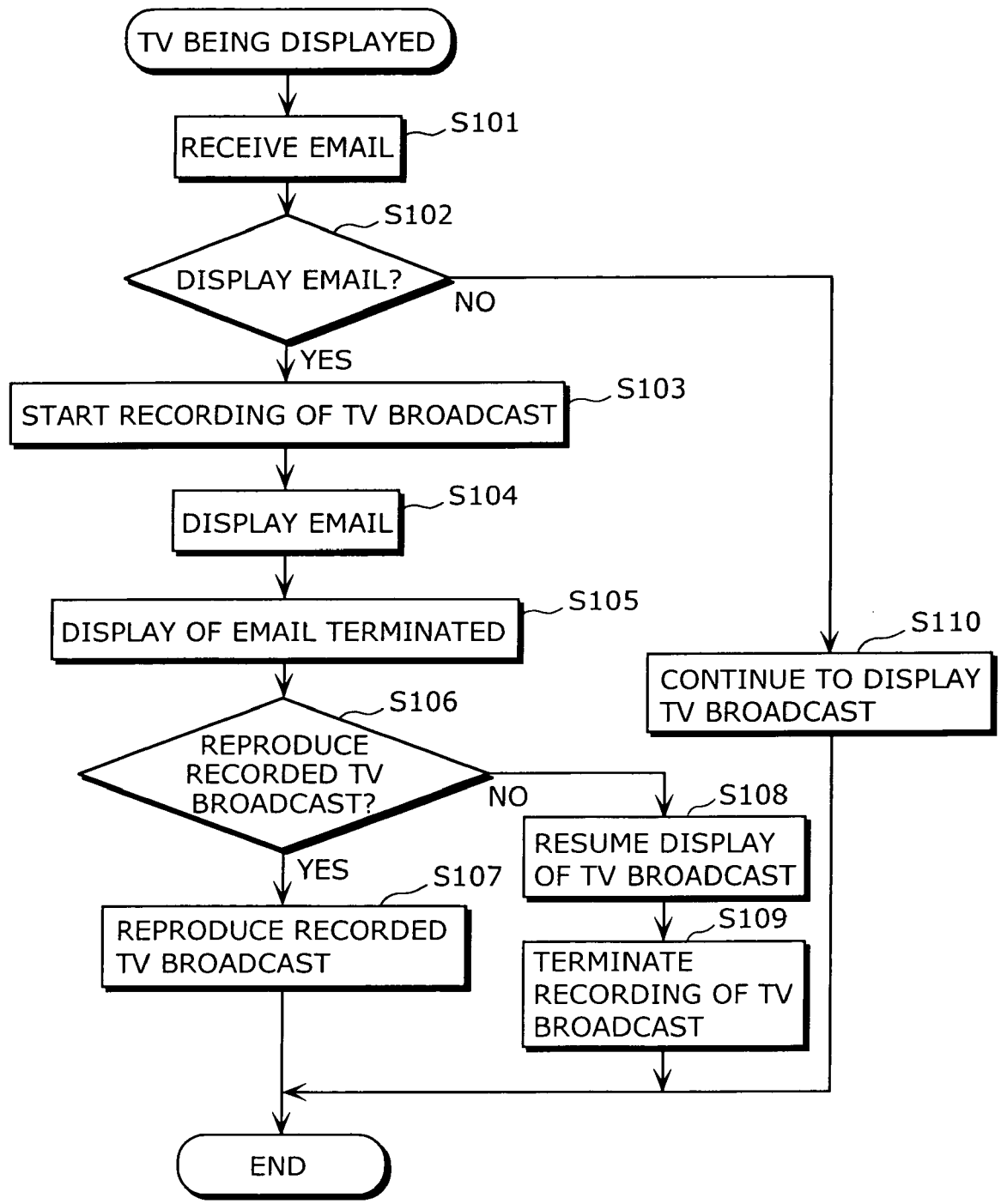
FIG. 3 is a flowchart showing a flow of an operation performed when an email is received while a television broadcast is being displayed.

FIG. 3 is a flowchart showing a flow of an operation performed when an email is received while a television broadcast is being displayed.

Upon receipt of the email via the radio unit 104 (step S101), the transmission/reception unit 105 notifies the control unit 119 that the email has been received as well as notifying the email processing unit 106 of the received email. The email processing unit 106 stores the notified email into the email saving unit 107. Meanwhile, the control unit 119 instructs the output control unit 108 to display an inquiry message that states the email has been received and that inquires whether or not to display the received email, on a predetermined area of the first display unit 109*a* on which the television broadcast is being displayed. Receiving this instruction, the output control unit 108 displays a message such as "An email has been received. Would you like to display it?" on the predetermined area of the first display unit 109*a* (step S102). Here, the predetermined area of the first display unit 109*a* on which the message is to be displayed may be an area d2, for example, outside an area d1 on which the television broadcast is being displayed, as shown in FIG. 4(*a*).

When the user selects "Not display" in response the message (NO in step S102), the control unit 119 instructs the output control unit 108 to delete the message and to continue to display the television broadcast. Receiving this instruction, the output control unit 108 deletes the message such as "An email has been received. Would you like to display it?" displayed on the predetermined area of the first display unit 109*a*, and then continues to display the television broadcast (step S110).

On the other hand, when the user selects "Display" in response to the message (YES in step S102), the control unit 119 instructs the recording control unit 116 to record the television broadcast program that is currently being displayed, onto the recording medium 115. Receiving this instruction, the recording control unit 116 records the television broadcast program that is currently being displayed, onto the recording medium 115 (step S103). At the same time, the control unit 119 instructs the output control unit 108 to display the received email on the first display unit 109*a*. Receiving this instruction, the output control unit 108 displays the received email on the first display unit 109*a* (step S104). Here, the user can operate using the operation unit 114 so as to read the received email or create a reply email to the received email.

Following this, when the user terminates the displaying of the email (step S105), the control unit 119 instructs the output control unit 108 to display an inquiry about whether or not to reproduce the recorded television broadcast program, on the first display unit 109*a*. Receiving this instruction, the output control unit 108 displays a message such as "Would you like to reproduce the recorded television broadcast program?" on the first display unit 109*a* (step S106). Here, when the user selects "Reproduce" in response to the message (YES in step S106), the control unit 119 instructs the reproduction control unit 117 to reproduce the television broadcast program recorded on the recording medium 115. Receiving this instruction, the reproduction control unit 117 reproduces the television broadcast program recorded on the recording medium 115 (step S107). It should be noted here that even during the reproduction of the television broadcast program recorded on the recording medium 115, the television broadcast currently being aired continues to be recorded.

On the other hand, when the user selects "Not reproduce" in response to the message (NO in step S106), the control unit 119 instructs the output control unit 108 to display the television broadcast currently being aired. Receiving this instruction, the output control unit 108 resumes the displaying of the television broadcast currently being aired on the first display unit 109*a* (step S108). At this time, the control unit 119 instructs the recording control unit 116 to terminate the recording of the television broadcast program, which is currently being displayed, onto the recording medium 115. Receiving this instruction, the recording control unit 116 terminates the recording of the television broadcast program, which is currently being displayed, onto the recording medium 115 (step S109). It should be noted that at this time the control unit 119 may instruct the recording control unit 116 to delete the television broadcast recorded on the recording medium 115. Alternatively, in advance of this, an inquiry may be made to ask the user about whether or not to delete the television broadcast recorded on the recording medium 115.

Note that regardless of the answer in response to the message, the control unit 119 may inquire of the user about whether or not to terminate the recording of the television broadcast program, which is currently being displayed, onto the recording medium 115. Or, the television broadcast program, which is currently being displayed, may continue to be recorded onto the recording medium 115 until the end of the program. It should be noted that the end of the program can be determined on the basis of the electronic program guide extracted by the auxiliary information processing unit 103.

As described so far, in the case where an email is received while the television broadcast is being displayed and this email is to be displayed, the email can be confirmed immediately as the television broadcast program that had been displayed until then is recorded onto the recording medium 115. Moreover, it becomes possible to view the television broadcast program aired during the displaying of the email or the creation of the reply email, after the termination of the displaying of the email.

Next, an explanation is given about a case where a double screen display is executed when the email is to be displayed without performing the recording onto the recording medium 115.

Figure 5:
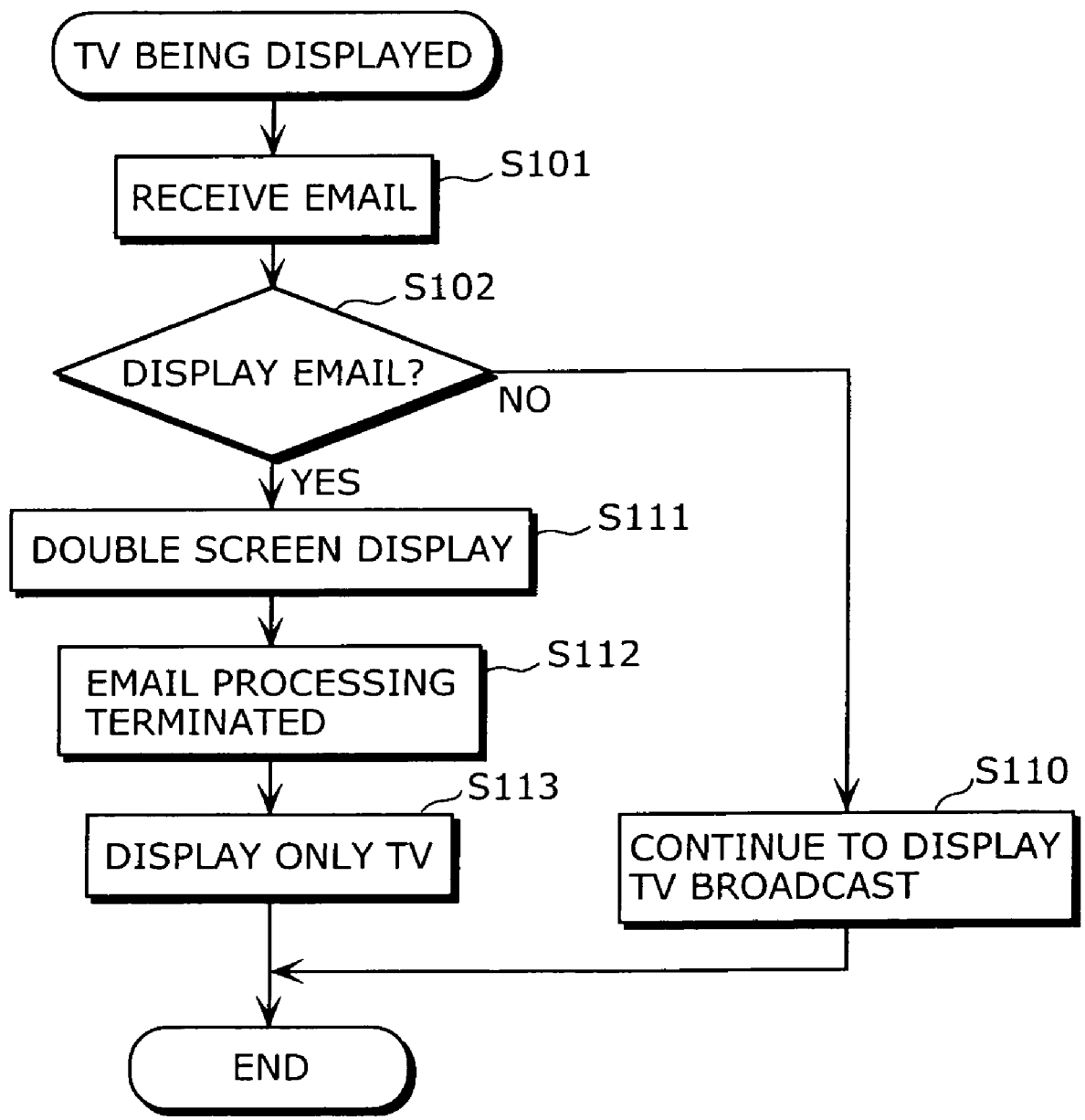
FIG. 5 is a flowchart showing a flow of another operation performed when an email is received while a television broadcast is being displayed.

FIG. 5 is a flowchart showing a flow of another operation performed when an email is received while a television broadcast is being displayed.

The operations performed from the receipt of the email while the television broadcast is being displayed until the displaying of the message such as "An email has been received. Would you like to display it?" (steps S101 and S102) are the same as described above. Also, when the user selects "Not display" in response to the message (NO in step S102), the television broadcast continues to be displayed as is the above case (step S109).

On the other hand, when the user selects "Display" in response to the message (YES in step S102), the control unit 119 instructs the output control unit 108 to split the screen area of the first display unit 109a and to display the television broadcast and the email respectively on the split areas. Receiving this instruction, the output control unit 108 terminates the displaying of the television broadcast on the area d1 of the first display unit 109a as shown in FIG. 4(a), splits the screen area of the first display unit 109a into two, which are an area d3 and an area d4 as shown in FIG. 4(b) for example, and then displays the received email on the area d3 and the television broadcast on the area d4 (step S111). Here, the user can operate using the operation unit 114 so as to read the email displayed on the area d3 of the first display unit 109a or create a reply email to the received email. It should be noted that at this time, an area d5 may be provided as a sub-screen inside the area d1 of the first display unit 109a as shown in FIG. 4(c) for example so that the received email can be displayed on the area d1 whereas the television broadcast can be displayed on the area d5.

Following this, when the user terminates the displaying of the email (step S112), the control unit 119 instructs the output control unit 108 to terminate the screen area splitting of the first display unit 109a and to display the television broadcast on the original area. Receiving this instruction, the output control unit 108 terminates the screen area splitting of the first display unit 109a and displays the television broadcast on the area d1 of the first display unit 109a as shown in FIG. 4(a) (step S113).

As described so far, in the case where an email is received while the television broadcast is being displayed and this email is to be displayed, the email can be confirmed immediately as the screen area of the first display unit 109a is split so as to simultaneously display the television broadcast and the email. Moreover, it becomes possible to view the television broadcast program even during the displaying of the email or the creation of a reply email.

Figure 6:
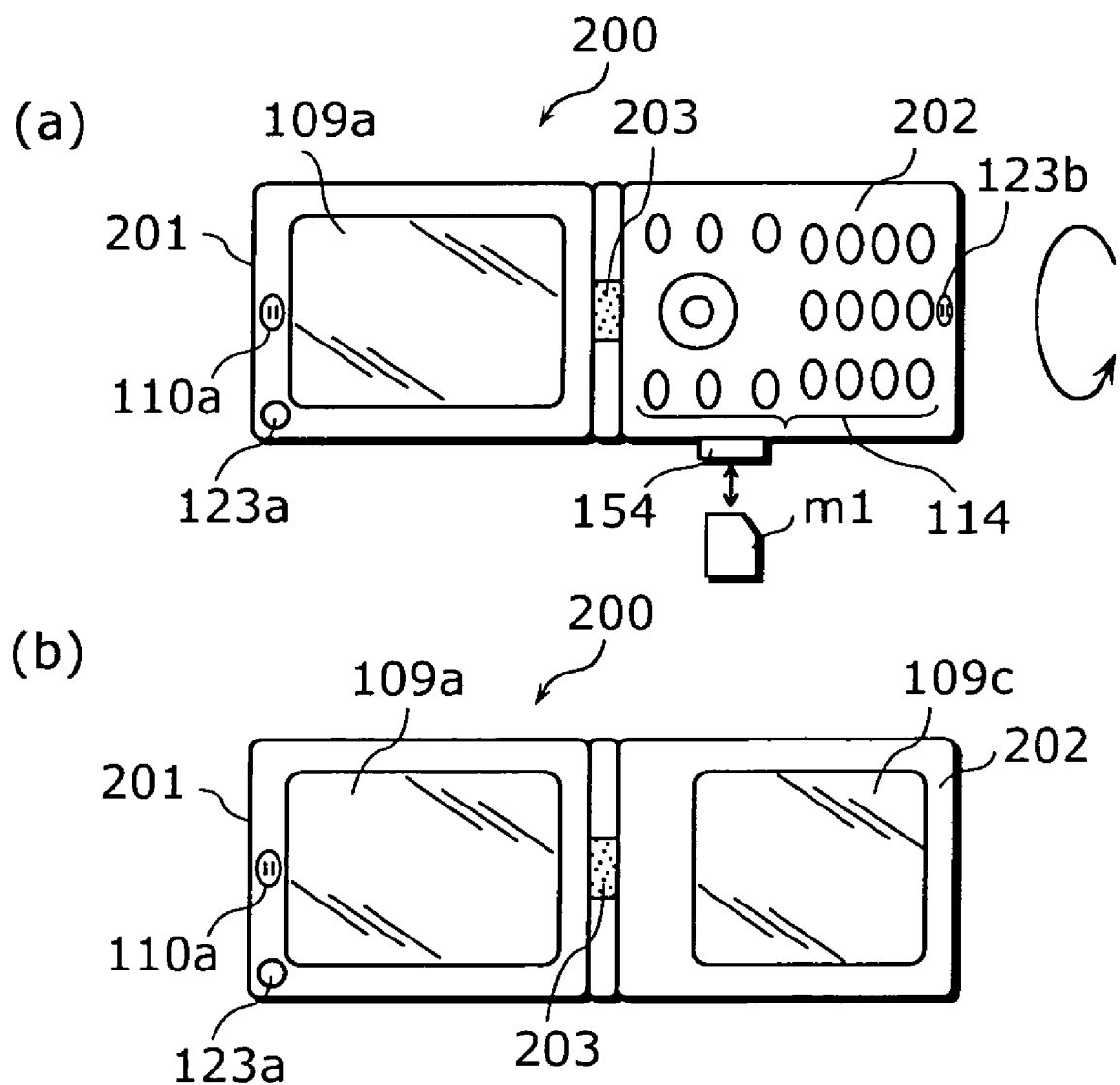
FIG. 6 is a diagram showing an external view of another mobile terminal device according to the embodiment of the present invention: (a) shows a front view of the mobile terminal device in an unfolded state; and (b) shows a front view of the mobile terminal device in a case where one main body unit has been rotated from the state shown in (a).

Although the screen area of the first display unit 109a is split into two areas on which the email and the television broadcast are respectively displayed in the above description, the present invention is not limited to this. For example, the email and the television broadcast may be displayed respectively on the first display unit and the second display unit. FIG. 6 is a diagram showing an external view of a mobile terminal device in this case: (a) shows a front view of the mobile terminal device in an unfolded state; and (b) shows a front view of the mobile terminal device in a case where one main body unit has been rotated from the state shown in (a). Note that the same components as those shown in FIG. 2 are assigned the same numerals as the numerals used in FIG. 2 and thus explanations of them will be omitted here.

As shown in FIGS. 6(a) and (b), a mobile terminal device 200 has a first main body unit 201 and a second main body unit 202 which are connected via a rotation connection unit 203, and is so structured as to be foldable. The first main body unit 201 has a first display unit 109a, a speaker 110a, and a camera 123a on the front. The second main body unit 152 has an operation unit 114 and a microphone 123b on the front, an interface 154 on the side, into which a memory card m1 is to be placed, and a second display unit 109c on the back. Moreover, the second main body unit 202 rotates 180 degrees with respect to the first main body unit 201 via the rotation connection unit 203. To be more specific, the second main body unit 202 rotates 180 degrees, so that a state where the front side of the first main body unit 201 and the front side of the second main body unit 202 are facing the same direction as shown in FIG. 6(a) is changed to a state where the front side of the first main body unit 201 and the back side of the second main body unit 202 are facing the same direction as shown in FIG. 6(b). With this, the user can simultaneously view the first display unit 109a and the second display unit 109c.

In the case of the mobile terminal device 200, when an email is received while the television broadcast is being displayed on the first display unit 109a and the email is to be displayed, the television broadcast continues to be displayed on the first display unit 109a and the email is displayed on the second display unit 109c.

In this way, as the mobile terminal device 200 simultaneously displays the television broadcast and the email using the two display units, the email can be confirmed immediately as is the above case. Moreover, it is possible to view the television broadcast program even during the displaying of the email or the creation of a reply email.

In the stated embodiment, when an email is received, the user is inquired whether or not to display the email. However, the present invention is not limited to this. For example, without inquiring of the user whether or not to display the email, an operation for continuing the displaying of the television broadcast or an operation for displaying the email may be performed. Such an operation can be set in advance in the initialization unit 118. On the basis of the details set in the initialization unit 118, the control unit 119 may control the displaying of the television broadcast and the displaying of the email.

Moreover, in the stated embodiment, when the displaying of the email is terminated while the television broadcast program is being recorded, the user is inquired whether or not to reproduce the recorded television broadcast program. However, the present invention is not limited to this. For example, without inquiring of the user whether or not to reproduce the recorded television broadcast program, an operation for reproducing the recorded television broadcast program or an operation for continuing the displaying of the television broadcast may be performed. Such an operation can be set in advance in the initialization unit 118. On the basis of the details set in the initialization unit 118, the control unit 119 may control the displaying of the television broadcast and the reproduction of the recorded television broadcast program.

Furthermore, in the stated embodiment, when an email is received and this email is to be displayed, the reproduction of the audio of the television broadcast by the audio reproduction unit 110 may be terminated or continued.

(Receive a Video Phone Call while a Television Broadcast is being Displayed)

Figure 7:
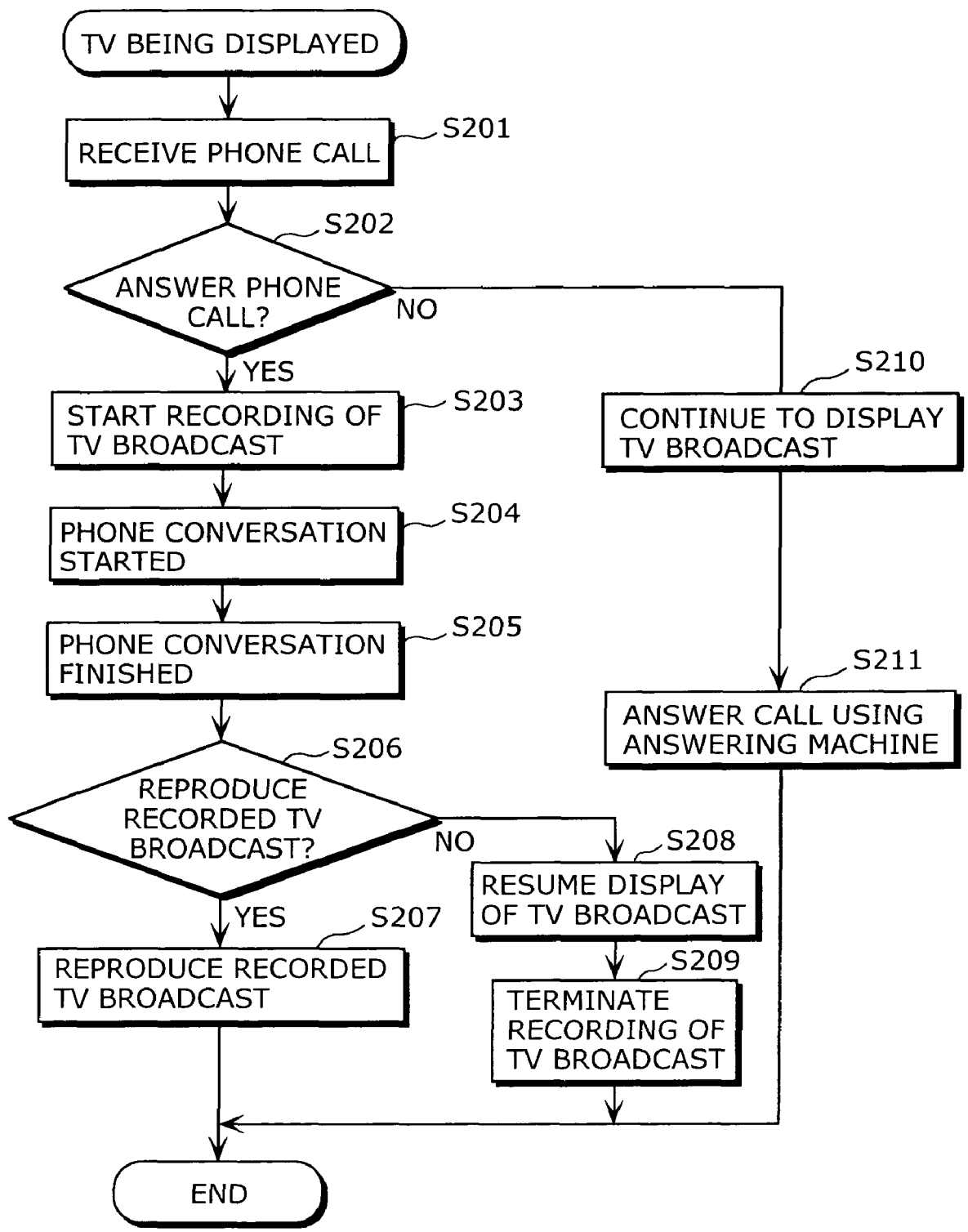
FIG. 7 is a flowchart showing a flow of an operation performed when a video phone call is received while a television broadcast is being displayed.

FIG. 7 is a flowchart showing a flow of an operation performed when a video phone call is received while a television broadcast is being displayed.

Upon receipt of the video phone call via the radio unit 104 (step S201), the transmission/reception unit 105 notifies the control unit 119 that the video phone call has been received as well as notifying the call processing unit 122 of the received video phone call. The control unit 119 instructs the notification unit 121 to notify the user that the call has been received. Receiving this instruction, the notification unit 121 notifies the user that the call has been received, by a sound, a vibration, a light emission, or the like (step S202).

As a result of the notification, when the user operates a predetermined key, for example, without answering the video phone call (NO in step S202), the control unit 119 instructs the notification unit 121 to terminate the notification as well as instructing the output control unit 108 to continue the displaying of the television broadcast. Receiving this instruction, the notification unit 121 terminates the notification. The output control unit 108 continues the displaying of the television broadcast (step S210). At the same time, the control unit 119 instructs the call-answering processing unit 113 to answer the call using an answering machine. Receiving this instruction, the call-answering processing unit 113 answers the received video phone call with a predetermined message and records a message from the caller (step S211).

On the other hand, as a result of the notification, when the user answers the video phone call (YES in step S202), the control unit 119 instructs the recording control unit 116 to record the television broadcast program currently being displayed, onto the recording medium 115. Receiving this instruction, the recording control unit 116 records the television broadcast program currently being displayed, onto the recording medium 115 (step S203). At the same time, the control unit 119 instructs the output control unit 108 to display the video of the received video phone call on the first display unit 109a. Receiving this instruction, the output control unit 108 displays the video of the received video phone call on the first display unit 109a and has the audio reproduced by the audio reproduction unit 110 (step S204). Here, the voice and video of the user are inputted by the video/audio input unit 123, and the user has a conversation with the caller via the call processing unit 122, the transmission/reception processing unit 105, and the radio unit 104.

Then, when the user finishes the video phone call (step S205), the control unit 119 instructs the output control unit 108 to display an inquiry message on the first display unit 109a as to whether or not to reproduce the recorded television broadcast program. Receiving this instruction, the output control unit 108 displays a message such as "Would you like to reproduce the recorded television broadcast program?" on the first display unit 109a (step S206). When the user selects "Reproduce" in response to the message (YES in step S206), the control unit 119 instructs the reproduction control unit 117 to reproduce the television broadcast program recorded on the recording medium 115. Receiving this instruction, the reproduction control unit 117 reproduces the television broadcast program recorded on the recording medium 115 (step S207).

On the other hand, when the user selects "Not reproduce" in response to the message (NO in step S206), the control unit 119 instructs the output control unit 108 to display the television broadcast currently being aired. Receiving this instruction, the output control unit 108 resumes the displaying of the television broadcast that is currently being aired, on the first display unit 109a (step S208). At this time, the control unit 119 instructs the recording control unit 116 to terminate the recording of the television broadcast program currently being displayed, onto the recording medium 115. Receiving this instruction, the recording control unit 116 terminates the recording of the television broadcast program currently being displayed, onto the recording medium 115 (step S209).

As described so far, in the case where a video phone call is received while the television broadcast is being displayed and this video phone call is answered, it becomes possible, even if answering the call, to view the television broadcast program later that was aired during the video phone call, after the end of the conversation. This is because the television broadcast program that had been displayed before the call was answered is recorded onto the recording medium 115.

It should be noted here that in the case where a video phone call is received while the television broadcast is being displayed and this video phone call is answered, the double screen display can also be executed without performing the recording onto the recording medium 115 as in the case of the email reception. In this case, the video of the video phone call may be displayed on the area or the display unit on which the email was displayed.

In addition, at this time, the volume of the audio of the television broadcast may be lowered and the volume of the audio of the video phone call may be raised for the simultaneous audio outputs. Alternatively, the audio of the television broadcast may be outputted from a speaker and the audio of the video phone call from an earphone. Or, using stereo earphones, the audio of the television broadcast may be outputted from one and the audio of the video phone call from the other for the simultaneous audio outputs.

(Receive a Voice-Only Phone Call while a Television Broadcast is being Displayed)

In this case, the basic operations are the same as those performed when the video phone call is received. Therefore, only different points are explained.

When the voice-only phone call is answered, there is no video to be displayed unlike the case of the video phone call. Thus, instead of the displaying of the video of the video phone call, simply nothing is displayed or the television broadcast can continue to be displayed.

Accordingly, as is the case with the video phone call, in the case where a call is received while the television broadcast is being displayed and this call is answered, it becomes possible, even if answering the call, to view the television broadcast program later that was aired during the call, after the end of the conversation. This is because the television broadcast program that had been displayed before the call is answered is recorded onto the recording medium 115.

(Fold the Mobile Terminal Device 100 while a Television Broadcast is being Displayed)

Figure 8:
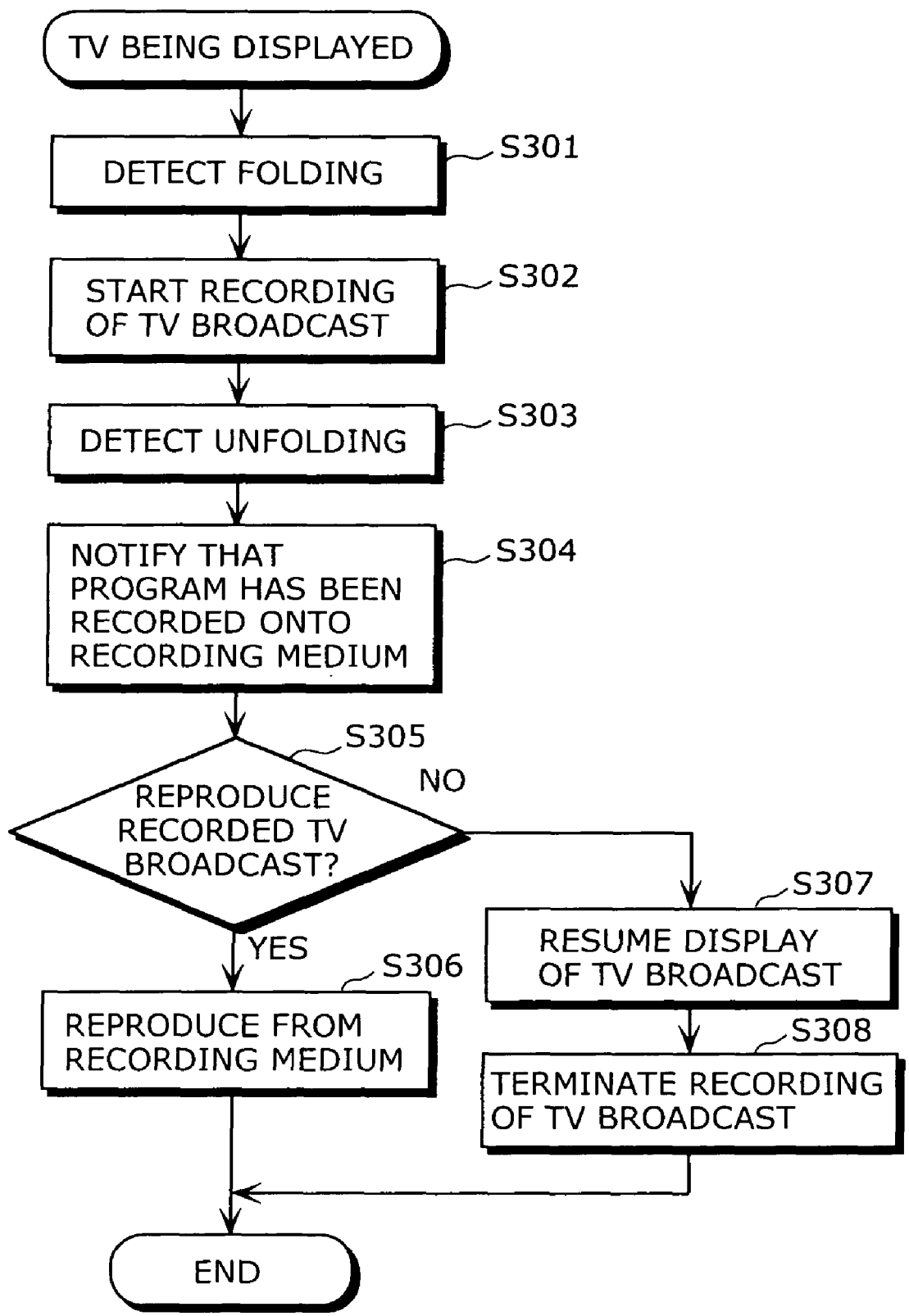
FIG. 8 is a flowchart showing a flow of an operation performed when the mobile terminal device is folded while a television broadcast is being displayed.

FIG. 8 is a flowchart showing a flow of an operation performed when the mobile terminal device 100 is folded while a television broadcast is being displayed.

When the unfold/fold detection unit 120 detects that the first main body unit 151 and the second main body unit 152 are folded (step S301), the control unit 119 instructs the recording control unit 116 to record the television broadcast program currently being displayed, onto the recording medium 115. Receiving this instruction, the recording control unit 116 records the television broadcast program currently being displayed, onto the recording medium 115 (step S302).

Then, when the unfold/fold detection unit 120 detects that the first main body unit 151 and the second main body unit 152 are unfolded (step S303), the control unit 119 instructs the output control unit 108 to display that the television broadcast program which had been displayed before the device was folded has been recorded onto the recording medium 115. Receiving this instruction, the output control unit 108 displays a message such as "The television broadcast program which had been displayed before the device was folded has been recorded." on the first display unit 109a (step S304). Moreover, the control unit 119 instructs the output control unit 108 to display an inquiry message on the first display unit 109a as to whether or not to reproduce the recorded television broadcast program. Receiving this instruction, the output control unit 108 displays a message such as "Would you like to reproduce the recorded television broadcast program?" on the first display unit 109a (step S305).

Here, when the user selects "Reproduce" in response to the message (YES in step S305), the control unit 119 instructs the reproduction control unit 117 to reproduce the television broadcast program recorded on the recording medium 115. Receiving this instruction, the reproduction control unit 117 reproduces the television broadcast program recorded on the recording medium 115 (step S306). It should be noted here that the television broadcast currently being aired continues to be recorded even during the reproduction of the television broadcast program recorded on the recording medium 115.

On the other hand, when the user selects "Not reproduce" in response to the message (NO in step S305), the control unit 119 instructs the output control unit 108 to display the television broadcast currently being aired. Receiving this instruction, the output control unit 108 resumes the displaying of the television broadcast currently being aired, on the first display unit 109a (step S307). At this time, the control unit 119 instructs the recording control unit 116 to terminate the recording of the television broadcast program currently being displayed, onto the recording medium 115. Receiving this instruction, the recording control unit 116 terminates the recording of the television broadcast program currently being displayed, onto the recording medium 115 (step S308). Here, the control unit 119 may inquire of the user as to whether or not to terminate the recording of the television broadcast program currently being displayed, onto the recording medium 115. Also, the television broadcast program, which is currently being displayed, may continue to be recorded onto the recording medium 115 until the end of the program. Moreover, the television broadcast recorded on the recording medium 115 may be deleted. In this case, in advance of the deletion, an inquiry may be made to the user as to whether or not to delete the television broadcast recorded on the recording medium 115.

As described so far, when the mobile terminal device 100 is folded while a television broadcast is being displayed, the television broadcast program that had been displayed is recorded onto the recording medium 115. Thus, when viewing the television broadcast on a train and getting off the train at a destination station, for example, the user can record the television broadcast program simply by folding the mobile terminal device 100. Then, by unfolding the mobile terminal device 100 again, the user can view the television broadcast program that had been aired while the device was being folded.

In the stated embodiment, when the first main body unit 151 and the second main body unit 152 are unfolded, the inquiry is made to the user as to whether or not to reproduce the recorded television broadcast program. However, the present invention is not limited to this. For example, without making the inquiry to the user as to whether or not to reproduce the recorded television broadcast program, an operation for reproducing the recorded television broadcast program or an operation for continuing the displaying of the television broadcast may be performed. Such an operation can be set in advance in the initialization unit 118. On the basis of the details set in the initialization unit 118, the control unit 119 may control the displaying of the television broadcast and the reproduction of the recorded television broadcast program.

Next, an explanation is given about a case where when the mobile terminal device 100 is folded while a television broadcast is being displayed, a server device (not shown) on a network, for example, records the television broadcast having been displayed until then. It should be noted here that the server device may exist on the network or in the house of the user, for example.

Figure 9:
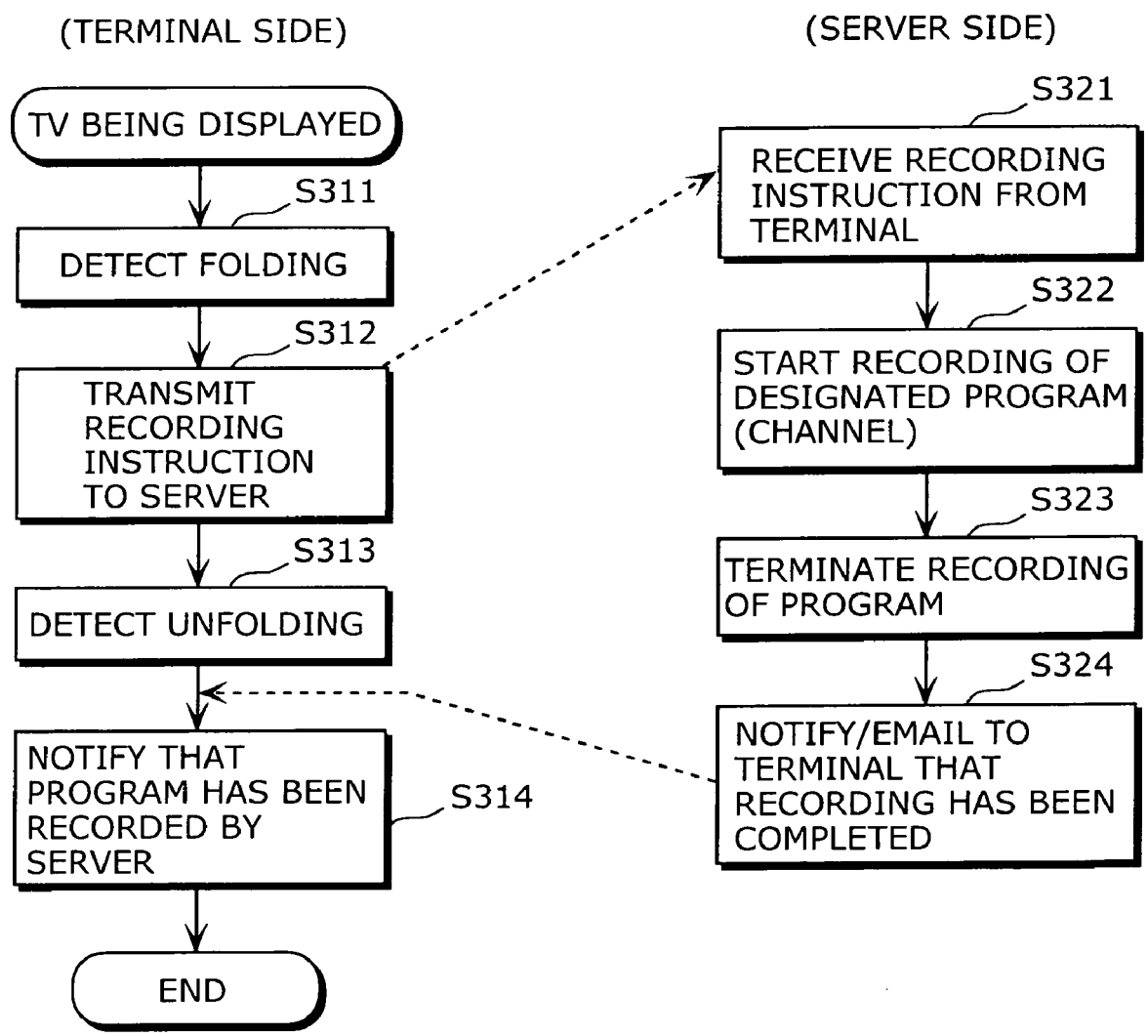
FIG. 9 is a flowchart showing a flow of an operation performed in a case where a server device records the television broadcast when the mobile terminal device is folded while a television broadcast is being displayed.

FIG. 9 is a flowchart showing a flow of an operation performed in a case where the server device records the television broadcast when the mobile terminal device 100 is folded while the television broadcast is being displayed.

When the unfold/fold detection unit 120 detects that the first main body unit 151 and the second main body unit 152 are folded (step S311), the control unit 119 instructs the server device to record the television broadcast program currently being displayed. To be more specific, the control unit 119 transmits a recording instruction via the transmission/reception processing unit 105 and the radio unit 104, along with a designation of a broadcast station (i.e., channel) of the television broadcast program currently being displayed (step S312).

Meanwhile, receiving the recording instruction (step S321), the server device starts recording the program aired by the designated broadcast station (step S322). At the end of the recorded program, the server device terminates the recording (step S323). After the end of the recording, the server device notifies the mobile terminal device, which transmitted the recording instruction, that the recording of the designated program has been completed (step S324).

On the side of the mobile terminal device 100, when the unfold/fold detection unit 120 detects that the first main body unit 151 and the second main body unit 152 are unfolded (step S313) and the completion notification of the designated program recording has been received from the server device, the control unit 119 instructs the output control unit 108 to display that the recording of the television broadcast program that had been displayed before the device was folded has been completed by the server device. Receiving this instruction, the output control unit 108 displays a message such as "The television broadcast program which had been displayed before the device was folded has been recorded." on the first display unit 109a (step S314).

As described so far, when the mobile terminal device 100 is folded while a television broadcast is being displayed, the server device records the television broadcast program that had been displayed until then. Thus, the television broadcast program can be recorded simply by folding the mobile terminal device 100. Then, by unfolding the mobile terminal device 100, it becomes possible to view the television broadcast program that had been aired while the device was being folded. Moreover, when the remaining amount of storage available on a recording medium of the mobile terminal device 100 is small, for example, the recording can be performed by the server device with reliability.

In the stated embodiment, when the mobile terminal device 100 is folded while the television broadcast is being displayed, the television broadcast that had been displayed until then is recorded. However, the present invention is not limited to this. For example, the reception of the television broadcast that had been displayed until then can be stopped, as shown in FIG. 10(a). In this case, when the unfold/fold detection unit 120 detects that the first main body unit 151 and the second main body unit 152 are folded (step S331), the control unit 119 instructs the TV reception unit 101 to stop the reception of the television broadcast currently being displayed as well as instructing the output control unit 108 to stop the outputs of the video and audio of the television broadcast. Receiving this instruction, the TV reception unit 101 stops the reception of the television broadcast. The output control unit 108 then stops the outputs of the video and audio of the television broadcast (step S332).

Figure 10:
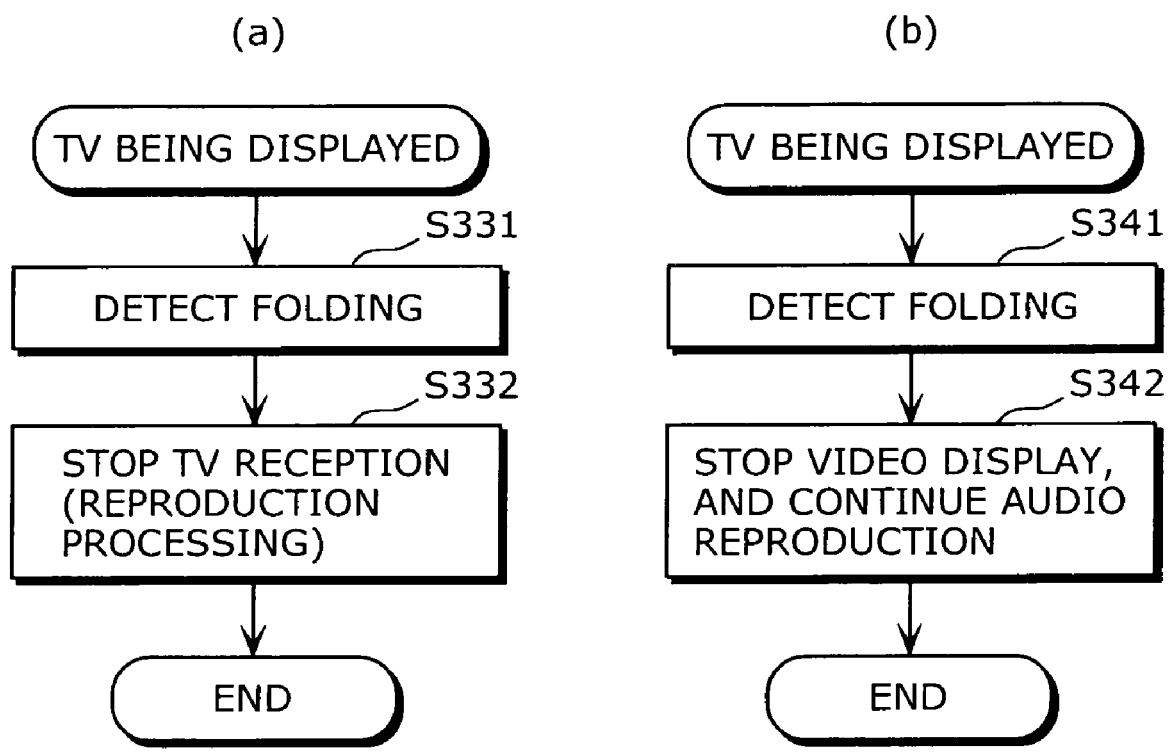
FIG. 10 is a flowchart showing a flow of an operation performed when the mobile terminal device is folded while a television broadcast is being displayed: (a) is a flowchart to stop the reception of the television broadcast; and (b) is a flowchart to stop the displaying of the television broadcast.

Moreover, the displaying of the television broadcast that had been displayed until then can be stopped, as shown in FIG. 10 (b). In this case, when the unfold/fold detection unit 120 detects that the first main body unit 151 and the second main body unit 152 are folded (step S341), the control unit 119 instructs the output control unit 108 to stop the displaying of the video of the television broadcast that is currently being displayed on the first display unit 109a. Receiving this instruction, the output control unit 108 stops the displaying of the video of the television broadcast on the first display unit 109a (step S342). At this time, the audio reproduction unit 110 continues to reproduce the audio of the television broadcast.

In this way, when the mobile terminal device 100 is folded while the television broadcast is being displayed, the reception or displaying of the television broadcast that had been displayed until then is stopped. Since the displaying on the display unit that consumes a lot of power is stopped, power consumption can be accordingly reduced.

Among from the above-explained operations performed when the mobile terminal device 100 is folded while the television broadcast is being displayed, an operation to be executed can be set in advance in the initialization unit 118 of the mobile terminal device 100. On the basis of the details set in the initialization unit 118, the control unit 119 may control the operation to be performed when the mobile terminal device 100 is folded.

In the stated embodiment, the explanation was given about a case where the television broadcast being displayed is recorded onto the recording medium when the first main body unit 151 and the second main body unit 152 are folded. However, it should be understood that the present invention is not limited to a fold type, and it may be, for example, a slide-type personal digital assistant. In this case, the same processing can be performed when the personal digital assistant is in a closed state in which the screen cannot be seen.

(Press an Output Stop Key while a Television Broadcast is being Displayed)

Figure 11:
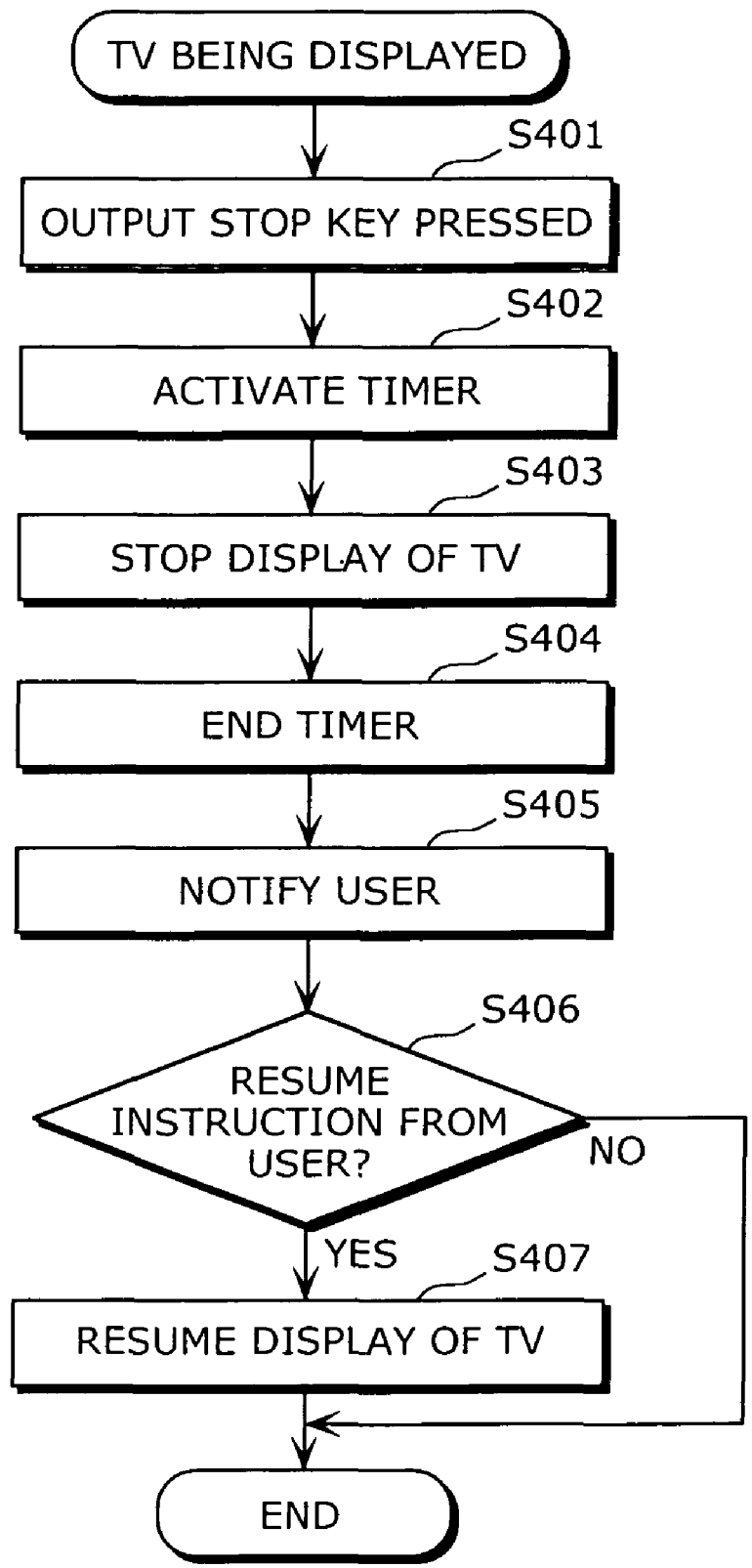
FIG. 11 is a flowchart showing a flow of an operation performed when an output stop key is pressed while a television broadcast is being displayed.

FIG. 11 is a flowchart showing a flow of an operation performed when an output stop key is pressed while a television broadcast is being displayed.

When the user presses the output stop key, which is a predetermined key of the operation unit 114 (step S401), the control unit 119 instructs the timer unit 112 to measure the predetermined period of time. Receiving this instruction, the timer unit 112 starts measuring the predetermined period of time (step S402). At the same time, the control unit 119 instructs the output control unit 108 to stop the displaying of the video of the television broadcast currently being displayed on the first display unit 109a. Receiving this instruction, the output control unit 108 stops the displaying of the video of the television broadcast on the first display unit 109a (step S403).

Then, the timer unit 112 notifies the control unit 119 when finishing measuring the predetermined period of time (step S404). The control unit 119 instructs the notification unit 121 to notify the user that the predetermined period of time has elapsed. Receiving this instruction, the notification unit 121 notifies the user that the predetermined period of time has elapsed by a sound, a vibration, a light emission, or the like (step S405). At this time, the control unit 119 judges whether or not the user has pressed an output resume key, which is a predetermined key of the operation unit 114 (step S406). When judging that the user has pressed the output resume key (YES in step S406), the control unit 119 instructs the output control unit 108 to resume the displaying of the video of the television broadcast on the first display unit 109a. Receiving this instruction, the output control unit 108 resumes the displaying of the video of the television broadcast on the first display unit 109a (step S407).

In this way, when the output stop key is pressed while the television broadcast is being displayed, the displaying of the television broadcast that had been displayed until then is stopped. Thus, there is no power consumption of the display unit that consumes a lot of power. This allows power consumption to be reduced.

In the stated embodiment, when the output stop key is pressed, the displaying of the video of the television broadcast on the first display unit 109a is stopped. However, the present invention is not limited to this. For example, the reception of the television broadcast may be stopped.

Moreover, in the stated embodiment, after the predetermined period of time has elapsed, the displaying is resumed when the output resume key is pressed. However, the present invention is not limited to this. For example, the displaying may be resumed after the predetermined period of time has elapsed, and a notification may be given to inform the user that the displaying has been resumed.

(Detect a Commercial while a Television Broadcast is being Displayed)

Figure 12:
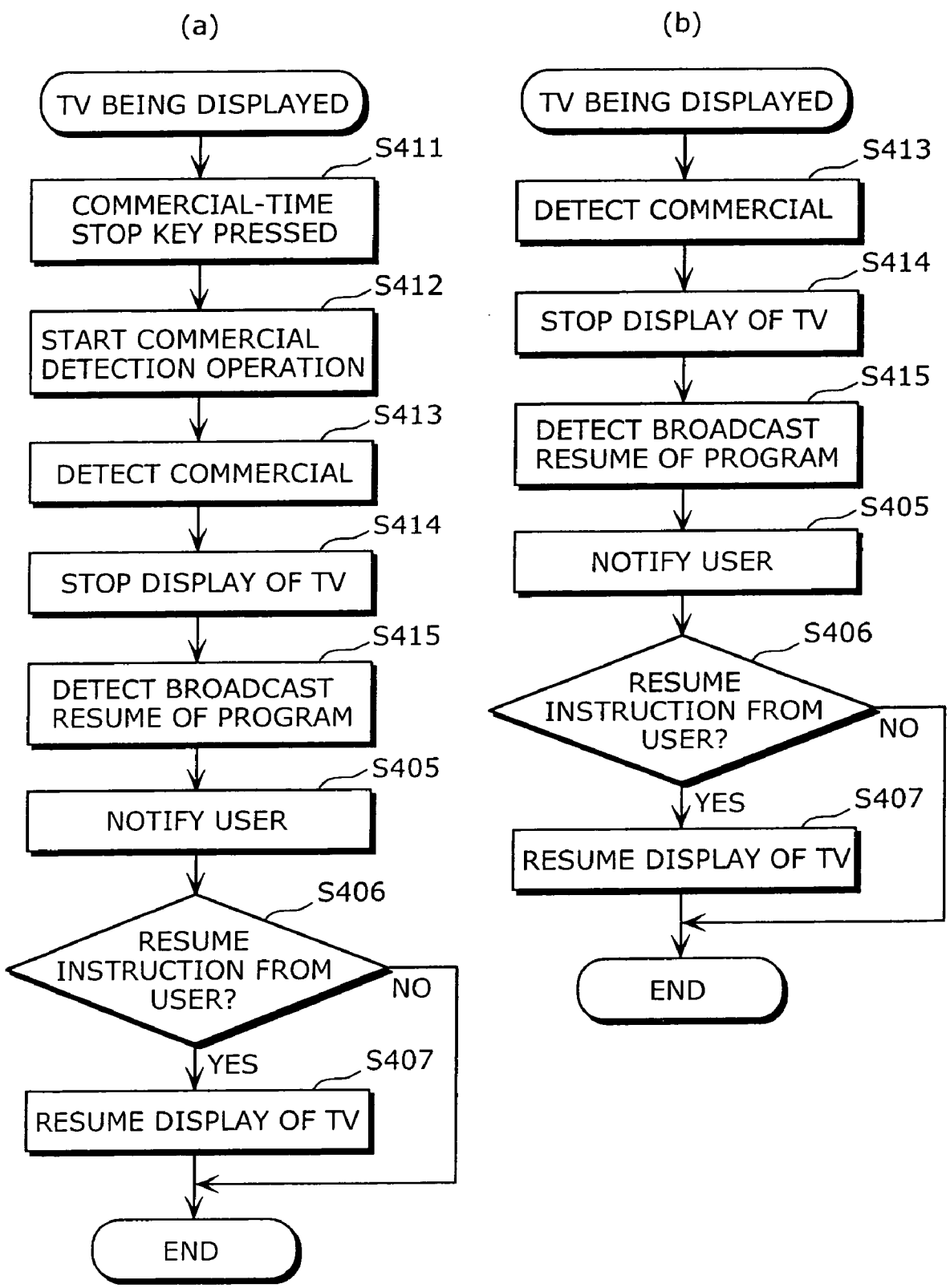
FIG. 12: (a) is a flowchart showing a flow of an operation performed when a commercial-time stop key is pressed while the television broadcast is being displayed; and (b) is a flowchart showing a flow of an operation performed in a case where commercial detection is previously set to be performed.

FIG. 12(a) is a flowchart showing a flow of an operation performed when a commercial-time stop key is pressed while the television broadcast is being displayed.

When the user presses the commercial-time stop key, which is a predetermined key of the operation unit 114 (step S411), the control unit 119 instructs the commercial detection unit 111 to detect a commercial during the television broadcast currently being displayed. Receiving this instruction, the commercial detection unit 111 starts detecting the commercial (step S412). When detecting the commercial, the commercial detection unit 111 notifies the control unit 119 (step S413). Following this, the control unit 119 instructs the output control unit 108 to stop the displaying of the video of the television broadcast currently being displayed on the first display unit 109a. Receiving this instruction, the output control unit 108 stops the displaying of the video of the television broadcast currently being displayed on the first display unit 109a (step S414).

Here, when detecting that the commercial ended and that the program has been resumed, the commercial detection unit 111 notifies the control unit 119 (step S415). The control unit 119 instructs the notification unit 121 to notify the user that the program has been resumed. Receiving this instruction, the notification unit 121 notifies the user that the program has been resumed, by a sound, a vibration, a light emission, or the like (step S416). At this time, the control unit 119 judges whether or not the user has pressed the output resume key, which is the predetermined key of the operation unit 114 (step S406). When detecting that the user has pressed the output resume key (YES in step S406), the control unit 119 instructs the output control unit 108 to resume the displaying of the video of the television broadcast on the first display unit 109a. Receiving this instruction, the output control unit 108 resumes the displaying of the video of the television broadcast on the first display unit 109a (step S407).

In the stated embodiment, the commercial detection unit 111 starts detecting the commercial at the press of the commercial-time stop key by the user. However, the commercial detection by the commercial detection unit 111 may be previously set to be performed in the initialization unit 118. FIG. 12(b) is a flowchart showing a flow of an operation performed in the case where the commercial detection is previously set to be performed. In this case, the press of the commercial-stop key and the operation for starting the commercial detection by the commercial detection unit 111 (steps S411 and S412) in the stated embodiment are omitted.

In this way, when a commercial is detected while the television broadcast is being displayed, the displaying of the television broadcast that had been displayed until then is stopped. Thus, there is no power consumption of the display unit that consumes a lot of power. This allows power consumption to be accordingly reduced.

In the stated embodiment, when the commercial is detected, the displaying of the video of the television broadcast on the first display unit 109a is stopped. However, the present invention is not limited to this. For example, in addition to stopping the displaying on the first display unit 109a, the reproduction of the audio of the television broadcast by the audio reproduction unit 110 may be stopped.

Moreover, in the stated embodiment, after the program has been resumed, the displaying is resumed at the press of the output resume key. However, the present invention is not limited to this. For example, after the predetermined period of time has elapsed, the displaying may be resumed and a notification may be given to inform the user that the displaying has been resumed.

In the above embodiment, the explanation has been given about the case of the television broadcasting by a stream such as the MPEG 2 transport stream, as an example. Note that the TV reception unit 101 and the TV processing unit 102 may receive and reproduce analog broadcasting.

Moreover, all the functional blocks shown in the block diagram of FIG. 1 are realized as an LSI which is typically an integrated circuit device. This LSI may be integrated into a single chip or into a plurality of chips (for example, the functional blocks except for the memory may be integrated into one chip). Although referred to as the LSI here, it may be referred to as an IC, a system LSI, a super LSI, or an ultra LSI depending on the scale of integration.

A method for circuit integration is not limited to application of an LSI. It may be realized using a dedicated circuit or a general purpose processor. After an LSI is manufactured, an FPGA (Field Programmable Gate Array) which is programmable or a reconfigurable processor for which the connections and settings of circuit cells inside the LSI are reconfigurable may be used.

Furthermore, if a circuit integration technology that replaces LSIs comes along owing to advances of the semiconductor technology or to a separate derivative technology, the functional blocks should be understandably integrated using that technology. There can be a possibility of adaptation of biotechnology, for example.

Also, among all the functional blocks, only the unit for storing the data may not be integrated into the single chip, and separately structured like the recording medium 115 of the present embodiment.

It should be noted that the central part of the functional blocks shown in the block diagram of FIG. 1 and of the flowcharts shown in FIGS. 3, 5, and 7 to 12 are realized by a processor and its programs.

Industrial Applicability

As described so far, the mobile terminal device of the present invention is suitable for a mobile terminal device which can receive and display a television broadcast, such as a television-equipped mobile phone and a television-equipped PDA (Personal digital assistant).

The invention claimed is:

1. A mobile terminal device comprising:
   a broadcast reception unit operable to receive a television broadcast signal;
   a display unit operable to display video;
   an audio reproduction unit operable to reproduce audio; and
   a control unit operable, when an event occurs while the received television broadcast is being outputted by said display unit and said audio reproduction unit, to control at least one of a displaying of video of the television broadcast by said display unit, a reproduction of audio of the television broadcast by said audio reproduction unit, and the event.

2. The mobile terminal device according to claim 1, further comprising
   a transmission/reception unit operable to transmit and receive an email,
   wherein the event is a reception of the email, and
   wherein said control unit is operable, when the email is received, to control the displaying of the video of the television broadcast, the reproduction of the audio of the television broadcast, and a processing of the email.

3. The mobile terminal device according to claim 2, further comprising:
   a storage unit operable to record the received television broadcast; and
   a recording control unit operable to control the recording of the television broadcast into said storage unit,
   wherein when the email is received, said control unit is operable to instruct said recording control unit to record the television broadcast and to have said display unit display the email.

4. The mobile terminal device according to claim 3,
   wherein after having said display unit display the email, said control unit is operable to have said audio reproduction unit reproduce the audio of the received television broadcast.

5. The mobile terminal device according to claim 3, further comprising
   an operation reception unit operable to receive an operation from a user,
   wherein when the email is received, said control unit is operable:
      to inquire of the user whether or not to display the email before instructing said recording control unit to record the television broadcast and having said display unit display the email; and
      to control a processing of the television broadcast and a processing of the email on the basis of an answer received by said operation reception unit from the user in response to the inquiry.

6. The mobile terminal device according to claim 5,
   wherein when the answer is to display the email, said control unit is operable to instruct said recording control unit to record the television broadcast and operable to have the email displayed.

7. The mobile terminal device according to claim 3, further comprising
   a reproduction control unit operable to reproduce the recorded television broadcast,
   wherein when the displaying of the email is terminated, said control unit is operable to instruct said reproduction control unit to reproduce the recorded television broadcast.

8. The mobile terminal device according to claim 3,
   wherein when the displaying of the email is terminated, said control unit is operable to notify the user that the television broadcast aired during the displaying of the email has been recorded.

9. The mobile terminal device according to claim 3,
   wherein when the displaying of the email is terminated, said control unit is operable to inquire of the user whether or not to reproduce the television broadcast having been recorded during the displaying of the email.

10. The mobile terminal device according to claim 2,
   wherein when the email is received, said control unit is operable to have said display unit display the email, and to have said audio reproduction unit reproduce the audio of the received television broadcast after having the display unit display the email.

11. The mobile terminal device according to claim 2, further comprising an output control unit operable to split a screen area of said display unit into split areas and to display the video of the television broadcast and the email on the split areas, respectively,
   wherein when the email is received, said control unit is operable to instruct said output control unit to display the video of the television broadcast and the email on the split areas, respectively.

12. The mobile terminal device according to claim 2, further comprising:
   a second display unit operable to display; and
   an output control unit operable to have the video of the television broadcast and the email displayed on said display unit and said second display unit, respectively,
   wherein when the email is received, said control unit is operable to instruct said output control unit to display the video of the television broadcast and the email.

13. The mobile terminal device according to claim 2, further comprising
   an output control unit operable to display the email by overlaying the displaying of the email on the video of the television broadcast displayed on the display unit,
   wherein when the email is received, said control unit is operable to instruct said output control unit to display the email by overlaying the displaying of the email on the video of the television broadcast.

14. The mobile terminal device according to claim 11, further comprising
   an operation reception unit operable to receive an operation from the user,
   wherein when the email is received, said control unit is operable:
     to inquire of the user whether or not to display the email before instructing said output control unit to display the video of the television broadcast and the email on the split areas, respectively, and
     to control the displaying of the video of the television broadcast and the displaying of the email on the basis of an answer received by said operation reception unit from the user in response to the inquiry.

15. The mobile terminal device according to claim 1, further comprising
   a transmission/reception unit operable to transmit and receive a phone call,
   wherein the event is a reception of the phone call, and
   said control unit is operable, when the phone call is received, to control the displaying of the video of the television broadcast, the reproduction of the audio of the television broadcast, and a processing of the phone call.

16. The mobile terminal device according to claim 15,
   wherein when the phone call is received, said control unit is operable to have a call-answering machine pick up the phone call.

17. The mobile terminal device according to claim 15, comprising
   an operation reception unit operable to receive an operation from the user,
   wherein when the phone call is received, said control unit is operable:
     to inquire of the user whether or not to pick up the phone call; and
     to control a processing of the television broadcast and a processing of the phone call on the basis of an answer received by said operation reception unit from the user in response to the inquiry.

18. The mobile terminal device according to claim 17,
   wherein when the answer is not to pick up the phone call, said control unit is operable to have a call-answering machine pick up the phone call.

19. The mobile terminal device according to claim 17, further comprising:
   a storage unit operable to record the received television broadcast; and
   a recording control unit operable to control the recording of the television broadcast into said storage unit,
   wherein when the answer is to pick up the phone call, said control unit is operable to instruct said recording control unit to record the television broadcast and operable to perform a phone conversation processing.

20. The mobile terminal device according to claim 19, further comprising
   a reproduction control unit operable to reproduce the recorded television broadcast,
   wherein when the phone call is finished, said control unit is operable to instruct said reproduction control unit to reproduce the recorded television broadcast.

21. The mobile terminal device according to claim 19,
   wherein when the phone call is finished, said control unit is operable to notify the user that the television broadcast aired during the phone call has been recorded.

22. The mobile terminal device according to claim 19,
   wherein when the phone call is finished, said control unit is operable to inquire of the user whether or not to reproduce the television broadcast having been recorded during the phone call.

23. The mobile terminal device according to claim 17,
   wherein when the answer is to pick up the phone call, said control unit is operable to display the video of the received television broadcast and to perform a phone conversation processing.

24. The mobile terminal device according to claim 23,
   wherein when the answer is to pick up the phone call, said control unit is operable to display the video of the received television broadcast, to perform the phone conversation processing, and to reproduce a mixture of the audio of the television broadcast and audio of the phone call.

25. The mobile terminal device according to claim 23, further comprising:
   a second audio reproduction unit operable to reproduce audio; and
   an output control unit operable to have said audio reproduction unit and said second audio reproduction unit reproduce the audio of the television broadcast and the audio of the phone call, respectively,
   wherein when the answer is to pick up the phone call, said control unit is operable to have the video of the received television broadcast displayed, to perform the phone conversation processing, and to instruct said output control unit to reproduce the audio of the television broadcast and the audio of the phone call.

26. The mobile terminal device according to claim 17, wherein the phone call is a phone call accompanied by video,
wherein said mobile terminal device further comprises:
an output control unit operable to split a screen area of said display unit into split areas and to display the video of the television broadcast and the video of the phone call on the split areas, respectively, and
wherein said control unit is operable, when the answer is to pick up the phone call, to instruct said output control unit to display the video of the television broadcast and the video of the phone call on the split areas, respectively.

27. The mobile terminal device according to claim 17, wherein the phone call is a phone call accompanied by video,
wherein said mobile terminal device further comprises:
a second display unit operable to display; and
an output control unit operable to display the video of the television broadcast and the video of the phone call on said display unit and said second display unit, respectively, and
wherein said control unit is operable, when the answer is to pick up the phone call, to instruct said output control unit to display the video of the television broadcast and the video of the phone call.

28. The mobile terminal device according to claim 1, having a first main body unit and a second main body unit which are connected via a connection unit to be able to overlap each other, and further comprising:
a storage unit operable to record the received television broadcast;
a recording control unit operable to control the recording of the television broadcast into said storage unit; and
an open/close detection unit operable to detect whether the first main body unit and the second main body unit overlap each other or are opened,
wherein the event is the overlapping of the first main body unit and the second main body unit, and
wherein said control unit is operable, when said open/close detection unit detects the overlapping of the first main body unit and the second main body unit, to instruct said recording control unit to record the television broadcast.

29. The mobile terminal device according to claim 28, further comprising
a reproduction control unit operable to reproduce the recorded television broadcast,
wherein when said open/close detection unit detects that the first main body unit and the second main body unit are opened from a state of the overlapping, said control unit is operable to instruct said recording control unit to record the television broadcast.

30. The mobile terminal device according to claim 28, wherein when said open/close detection unit detects that the first main body unit and the second main body unit are reopened from a state of the overlapping, said control unit is operable to notify the user that the television broadcast has been recorded during a period of time from the overlapping to the reopening.

31. The mobile terminal device according to claim 28, wherein when said open/close detection unit detects that the first main body unit and the second main body unit are reopened from a state of the overlapping, said control unit is operable to inquire of the user whether or not to reproduce the television broadcast having been recorded during a period of time from the overlapping to the reopening.

32. The mobile terminal device according to claim 1, having a first main body unit and a second main body unit which are connected via a connection unit to be able to overlap each other, and further comprising
an open/close detection unit operable to detect whether the first main body unit and the second main body unit overlap each other or are opened,
wherein the event is the overlapping of the first main body unit and the second main body unit, and
wherein said control unit is operable, when said open/close detection unit detects the overlapping of the first main body unit and the second main body unit, to control the reception of the television broadcast and the displaying of the video of the television broadcast.

33. The mobile terminal device according to claim 1, wherein when said open/close detection unit detects the overlapping of the first main body unit and the second main body unit, said control unit is operable to stop the displaying of the video of the television broadcast.

34. The mobile terminal device according to claim 1, wherein when said open/close detection unit detects the overlapping of the first main body unit and the second main body unit, said control unit is operable to stop the reception of the television broadcast.

35. The mobile terminal device according to claim 1, having a first main body unit and a second main body unit which are connected via a connection unit able to overlap each other, and further comprising
an open/close detection unit operable to detect whether the first main body unit and the second main body unit overlap each other or are opened,
wherein the event is the overlapping of the first main body unit and the second main body unit, and
wherein said control unit is operable, when said open/close detection unit detects the overlapping of the first main body unit and the second main body unit, to instruct a separate device to record the television broadcast.

36. The mobile terminal device according to claim 35, further comprising:
a storage unit operable to record the received television broadcast; and
a recording control unit operable to control the recording of the television broadcast into the storage unit,
wherein said control unit is operable to instruct said recording control unit to record the television broadcast, and to instruct said recording control unit to terminate the recording of the television broadcast in accordance with a notification from the separate device that the recording has been started.

37. The mobile terminal device according to claim 35, wherein when receiving a notification from the separate device that the recording has been terminated, said control unit is operable to notify the user that the television broadcast has been recorded by the separate device.

38. The mobile terminal device according to claim 1, further comprising
an operation reception unit operable to receive an operation from the user,
wherein the event is a reception of a predetermined operation by said operation reception unit, and
wherein said control unit is operable, when said operation reception unit receives the predetermined operation, to stop the displaying of the video of the television broadcast, the reproduction of the audio of the television broadcast, or the reception of the television broadcast.

39. The mobile terminal device according to claim 38, wherein after a predetermined period of time has elapsed since the predetermined operation was received, said control unit is operable to notify the user that the predetermined period of time has elapsed.

40. The mobile terminal device according to claim 39, wherein said control unit is operable to notify the user that the predetermined period of time has elapsed by a vibration, a sound, a light emission, or a displayed indication.

41. The mobile terminal device according to claim 38, wherein when the predetermined operation is received while the displaying of the video of the television broadcast or the reception of the television broadcast is stopped, said control unit is operable to resume the displaying of the video of the television broadcast, the reproduction of the audio of the television broadcast, or the reception of the television broadcast.

42. The mobile terminal device according to claim 38, wherein after a predetermined period of time has elapsed since the predetermined operation was received, said control unit is operable to resume the displaying of the video of the television broadcast, the reproduction of the audio of the television broadcast, or the reception of the television broadcast.

43. The mobile terminal device according to claim 1, further comprising
a commercial detection unit operable to detect a commercial,
wherein the event is the detection of the commercial by said commercial detection unit, and
wherein said control unit is operable, when said commercial detection unit detects the commercial, to stop the displaying of the video of the television broadcast or the reproduction of the audio of the television broadcast.

44. The mobile terminal device according to claim 43, wherein when said commercial detection unit detects an end of the commercial, said control unit is operable to resume the displaying of the video of the television broadcast or the reproduction of the audio of the television broadcast that was stopped.

45. A control method used by a mobile terminal device which reproduces a television broadcast signal, said control method comprising:
a broadcast reception step of receiving a television broadcast signal;
a display step of displaying video;
an audio reproduction step of reproducing audio; and
a control step of, when an event occurs while the received television broadcast is being outputted in said display step and said audio reproduction step, controlling at least one of a displaying of video of the television broadcast in said display step, a reproduction of audio of the television broadcast in said audio reproduction step, and the event.

46. A non-transitory computer readable recording medium having stored thereon a program for controlling a mobile terminal device which reproduces a television broadcast signal, wherein, when executed, said program causes the mobile terminal device to perform a method comprising:
a broadcast reception step of receiving a television broadcast signal;
a display step of displaying video;
an audio reproduction step of reproducing audio; and
a control step of, when an event occurs while the received television broadcast is being outputted in said display step and said audio reproduction step, controlling at least one of a displaying of video of the television broadcast in said display step, a reproduction of audio of the television broadcast in said audio reproduction step, and the event.

47. An integrated circuit for controlling a mobile terminal device which reproduces a television broadcast signal, said integrated circuit comprising:
a broadcast reception unit operable to receive a television broadcast signal; and
a control unit operable, when an event occurs while the received television broadcast is being outputted, to control at least one of a displaying of video of the television broadcast, a reproduction of audio of the television broadcast, and the event.

48. The mobile terminal device according to claim 4, further comprising
an operation reception unit operable to receive an operation from a user,
wherein when the email is received, said control unit is operable:
to inquire of the user whether or not to display the email before giving instructing said recording control unit to record the television broadcast and having said display unit display the email; and
to control a processing of the television broadcast and a processing of the email on the basis of an answer received by said operation reception unit from the user in response to the inquiry.

49. The mobile terminal device according to claim 6, further comprising
a reproduction control unit operable to reproduce the recorded television broadcast,
wherein when the displaying of the email is terminated, said control unit is operable to instruct said reproduction control unit to reproduce the recorded television broadcast.

50. The mobile terminal device according to claim 6, wherein when the displaying of the email is terminated, said control unit is operable to notify the user that the television broadcast aired during the displaying of the email has been recorded.

51. The mobile terminal device according to claim 6, wherein when the displaying of the email is terminated, said control unit is operable to inquire of the user whether or not to reproduce the television broadcast having been recorded during the displaying of the email.

52. The mobile terminal device according to claim 12, further comprising
an operation reception unit operable to receive an operation from the user,
wherein when the email is received, said control unit is operable:
to inquire of the user whether or not to display the email before instructing said output control unit to display the video of the television broadcast and the email, and
to control the displaying of the video of the television broadcast and the displaying of the email on the basis of an answer received by said operation reception unit from the user in response to the inquiry.

53. The mobile terminal device according to claim 13, further comprising
an operation reception unit operable to receive an operation from the user,
wherein when the email is received, said control unit is operable:

to inquire of the user whether or not to display the email before giving the instruction to display the email by overlaying the displaying of the email on the video of the television broadcast, and to control the displaying of the video of the television broadcast and the displaying of the email on the basis of an answer received by said operation reception unit from the user in response to the inquiry.

54. The mobile terminal device according to claim 39, wherein when the predetermined operation is received while the displaying of the video of the television broadcast or the reception of the television broadcast is stopped, said control unit is operable to resume the displaying of the video of the television broadcast, the reproduction of the audio of the television broadcast, or the reception of the television broadcast.

55. The mobile terminal device according to claim 40, wherein when the predetermined operation is received while the displaying of the video of the television broadcast or the reception of the television broadcast is stopped, said control unit is operable to resume the displaying of the video of the television broadcast, the reproduction of the audio of the television broadcast, or the reception of the television broadcast.

* * * * *